US012643655B2

(12) United States Patent
Klinker et al.

(10) Patent No.: US 12,643,655 B2
(45) Date of Patent: Jun. 2, 2026

(54) AIRBORNE VEHICLE WITH MULTI-AIRFOIL TAIL

(71) Applicant: Regent Craft Inc., Winchestser, MA (US)

(72) Inventors: Michael Klinker, Hollis, MA (US); William Bryan Baker, Cohasset, MA (US); Bradley C. Buskirk, Charlotte, NC (US); Jason Castriota, Stamford, CT (US); Marco Borge, Vopiano (IT); William Thalheimer, Waltham, MA (US); Edward Lester, Somerville, MA (US); Daniel Cottrell, Centreville, VA (US)

(73) Assignee: REGENT Craft Inc., North Kingstown, RI (US)

( * ) Notice: Subject to any disclaimer, the term of this patent is extended or adjusted under 35 U.S.C. 154(b) by 896 days.

(21) Appl. No.: 17/845,480

(22) Filed: Jun. 21, 2022

(65) Prior Publication Data
US 2022/0324560 A1 Oct. 13, 2022

Related U.S. Application Data

(63) Continuation-in-part of application No. 17/570,090, filed on Jan. 6, 2022, now Pat. No. 11,420,738.
(Continued)

(51) Int. Cl.
*B64C 39/06* (2006.01)
*B63B 1/24* (2020.01)
(Continued)

(52) U.S. Cl.
CPC .............. *B64C 39/068* (2013.01); *B63B 1/24* (2013.01); *B63B 1/28* (2013.01); *B63B 1/30* (2013.01);
(Continued)

(58) Field of Classification Search
CPC B63B 1/24; B63B 1/242; B63B 1/244; B63B 1/248; B63B 1/26; B63B 1/28;
(Continued)

(56) References Cited

U.S. PATENT DOCUMENTS

| | | | | |
|---|---|---|---|---|
| 1,840,716 | A | | 1/1932 | Hitt |
| 1,861,491 | A | * | 6/1932 | Capelis .................. B64C 39/08 |
| | | | | 244/113 |

(Continued)

FOREIGN PATENT DOCUMENTS

| | | |
|---|---|---|
| CN | 104199462 A | 12/2014 |
| JP | 2018167792 A | 11/2018 |
| KR | 101615720 B1 * | 4/2016 |

OTHER PUBLICATIONS

International Searching Authority, International Search Report and Written Opinion mailed on Jul. 29, 2025, issued in connection with International Application No. PCT/US2025/026083, filed on Apr. 23, 2025, 10 pages.
(Continued)

*Primary Examiner* — Ajay Vasudeva
(74) *Attorney, Agent, or Firm* — Lee Sullivan Shea & Smith LLP

(57) ABSTRACT

An airborne vehicle having a body section; a main wing extending from the body section configured to generate aerodynamic lift, the main wing having one or more main wing control surfaces; and a tail assembly extending from the body section aft of the main wing. The tail assembly having a first tail member and a second tail member substantially parallel to each other. The first tail member having one or more control surfaces and the second tail member having one or more flap surfaces selectively deployable between a retracted position and an extended position. The flap surfaces being configured to increase a surface area
(Continued)

and/or camber of the second tail member in the extended position.

20 Claims, 16 Drawing Sheets

Related U.S. Application Data

(60) Provisional application No. 63/148,565, filed on Feb. 11, 2021, provisional application No. 63/281,594, filed on Nov. 19, 2021, provisional application No. 63/344,183, filed on May 20, 2022.

(51) Int. Cl.

| | |
|---|---|
| *B63B 1/28* | (2006.01) |
| *B63B 1/30* | (2006.01) |
| *B63B 1/32* | (2006.01) |
| *B64C 5/02* | (2006.01) |
| *B64C 25/10* | (2006.01) |
| *B64C 35/00* | (2006.01) |
| *B64C 39/04* | (2006.01) |
| *B64D 27/31* | (2024.01) |
| *B64D 27/34* | (2024.01) |
| *B64D 27/357* | (2024.01) |

(52) U.S. Cl.
CPC ............... *B63B 1/322* (2013.01); *B64C 5/02* (2013.01); *B64C 35/001* (2013.01); *B64C 35/006* (2013.01); *B64C 35/007* (2013.01); *B64C 35/008* (2013.01); *B64C 39/04* (2013.01); *B64C 39/06* (2013.01); *B64D 27/31* (2024.01); *B64D 27/34* (2024.01); *B64D 27/357* (2024.01); *B64C 25/10* (2013.01)

(58) Field of Classification Search
CPC ......... B63B 1/30; B64C 35/00; B64C 35/001; B64C 35/003; B64C 35/005; B64C 35/006; B64C 35/007; B64C 35/008; B64C 39/04; B64C 39/06; B64C 39/062; B64C 39/064; B64C 39/066; B64C 39/068; B64C 39/08
See application file for complete search history.

(56) References Cited

U.S. PATENT DOCUMENTS

| | | | |
|---|---|---|---|
| 1,881,141 A | | 10/1932 | Sikorsky |
| 2,214,945 A | | 9/1940 | Weihmiller |
| 2,400,173 A | | 5/1946 | Slate |
| 2,793,827 A | | 5/1957 | Ries et al. |
| 2,844,339 A | | 7/1958 | Stroukoff |
| 2,942,810 A | | 6/1960 | Francis |
| 3,082,975 A | * | 3/1963 | Cardwell ............... B64C 35/00 |
| | | | 114/313 |
| 3,139,059 A | | 6/1964 | Hanford |
| 3,498,247 A | | 3/1970 | Handler |
| 3,750,978 A | | 8/1973 | Cunningham |
| 4,080,922 A | | 3/1978 | Brubaker |
| 4,484,721 A | | 11/1984 | Gue |
| 4,962,978 A | | 10/1990 | Weston |
| 5,018,686 A | | 5/1991 | Zimmer |
| 6,086,014 A | * | 7/2000 | Bragg, Jr. ................ B60F 5/02 |
| | | | 244/49 |
| 6,547,181 B1 | | 4/2003 | Hoisington |
| 6,732,672 B2 | | 5/2004 | Shin |
| 7,275,493 B1 | | 10/2007 | Brass |
| D594,811 S | * | 6/2009 | Cazals .......................... D12/345 |
| 8,152,095 B2 | * | 4/2012 | Cazals ................... B64D 33/02 |
| | | | 244/55 |
| 8,371,520 B2 | * | 2/2013 | Easter ................... B64C 25/405 |
| | | | 244/49 |
| 9,096,312 B2 | * | 8/2015 | Moxon ................. B64D 27/33 |
| 9,688,356 B2 | | 6/2017 | Schulz |
| 11,420,738 B1 | * | 8/2022 | Thalheimer .............. B60V 1/22 |
| 11,667,352 B2 | | 6/2023 | Leason et al. |
| 2017/0308099 A1 | | 10/2017 | Kim et al. |
| 2018/0343050 A1 | | 11/2018 | Tillotson |
| 2018/0354613 A1 | * | 12/2018 | Cvrlje ................... B64C 39/068 |
| 2019/0291863 A1 | | 9/2019 | Lyasoff et al. |
| 2021/0223385 A1 | | 7/2021 | Breton et al. |
| 2021/0339881 A1 | | 11/2021 | Bevirt et al. |
| 2022/0046177 A1 | | 2/2022 | Honjo et al. |
| 2022/0223049 A1 | | 7/2022 | Lavretsky et al. |
| 2022/0250743 A1 | | 8/2022 | Thalheimer et al. |
| 2022/0315214 A1 | | 10/2022 | Mitani et al. |
| 2023/0358888 A1 | | 11/2023 | Lustig et al. |
| 2023/0411958 A1 | | 12/2023 | Long et al. |

OTHER PUBLICATIONS

Non-Final Office Action mailed on Jun. 20, 2025, issued in connection with U.S. Appl. No. 17/875,942, filed Jul. 28, 2022, 23 pages.
Non-Final Office Action mailed on Apr. 23, 2025, issued in connection with U.S. Appl. No. 17/892,484, filed Aug. 22, 2022, 15 pages.

\* cited by examiner

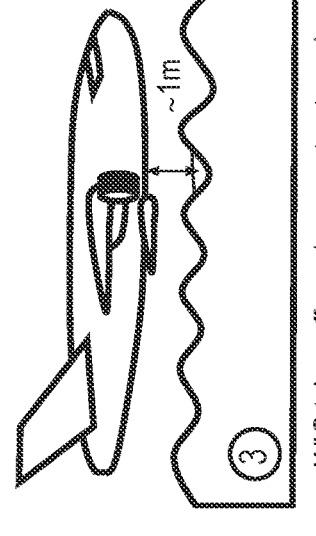

① Passengers board WIG at a dock. WIG uses onboard propulsion for maneuvering.

② WIG takes off on hydrofoil and exits port while insulated from waves.

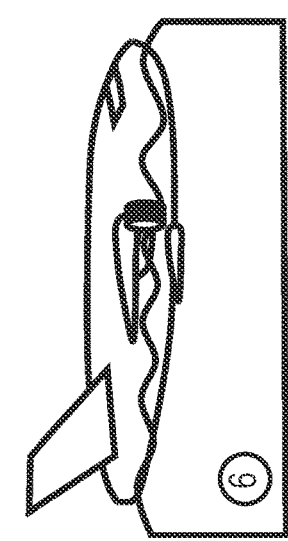

③ WIG takes off on wings, retracts and stows hydrofoils, accelerates to cruising speed, flying approximately 1m above the water.

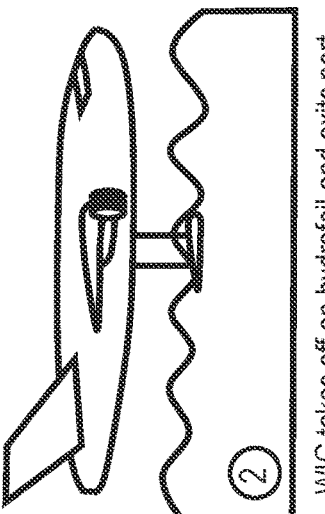

④ WIG slows down and lands on vehicles hull.

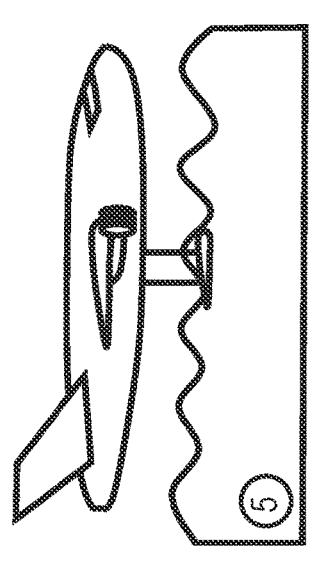

⑤ WIG deploys hydrofoil and maneuvers into port while insulated from waves.

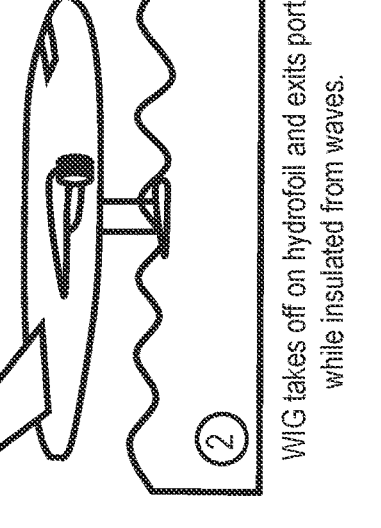

⑥ Passengers deboard vehicle at a dock. If available, vehicle propulsion battery is charged.

CONTROLLER DETERMINES
ELEVATOR FAILURE

820

CONTROLLER MODIFIES FLAP
CONTROL TO INCLUDE ELEVATOR
CONTROL SIGNALS

AIRBORNE VEHICLE WITH MULTI-AIRFOIL TAIL

CROSS-REFERENCE TO RELATED APPLICATIONS

This application is a continuation-in-part of U.S. patent application Ser. No. 17/570,090, filed on Jan. 6, 2022, which claims the benefit of priority under 35 U.S.C. § 119 to U.S. Provisional Patent Application No. 63/148,565, filed on Feb. 11, 2021, and U.S. Provisional Patent Application No. 63/281,594, filed on Nov. 19, 2021. This application also claims the benefit of U.S. Provisional Application No. 63/344,183, filed on May 20, 2022. The entire disclosures of each of the above applications are incorporated herein by reference.

FIELD

The present disclosure relates to an airborne vehicle and, more particularly, relates to an airborne vehicle having a multi-airfoil tail system for enhanced pitch authority.

BACKGROUND

This section provides background information related to the present disclosure which is not necessarily prior art. This section provides a general summary of the disclosure, and is not a comprehensive disclosure of its full scope or all of its features.

Airborne vehicles, such as aircraft, wing-in-ground effect vehicles, and other vehicles operable to travel based at least in part on aerodynamic lift, often must transition from a ground or water-based phase of operation to an airborne phase of operation. During this transition, it is often necessary to increase a pitch attitude of the vehicle such that the angle of attack of the main wing or lifting surface is increased to generate sufficient aerodynamic lift to at least partially transition the vehicle from the ground or water-based phase of operation to at least a partial-airborne phase of operation. It should be understood that the principle requiring an increased angle of attack of the main wing is generally necessary irrespective of whether the airborne vehicle is transitioning to fully airborne flight, wing-in-ground effect flight, partially-airborne flight, or a combination thereof.

Recently, there has been an interest in wing-in-ground effect flight wherein a vehicle is able to move over a ground or water surface by gaining support from the reactions of the air against the ground or water surface to reduce induced drag according to the principle of ground effect. This reduction in induced drag provides improved efficiencies of travel.

DRAWINGS

The drawings described herein are for illustrative purposes only of selected embodiments and not all possible implementations, and are not intended to limit the scope of the present disclosure.

FIG. 6 depicts various operational modes of the example WIG.

Corresponding reference numerals indicate corresponding parts throughout the several views of the drawings.

DETAILED DESCRIPTION

Figure 1A:
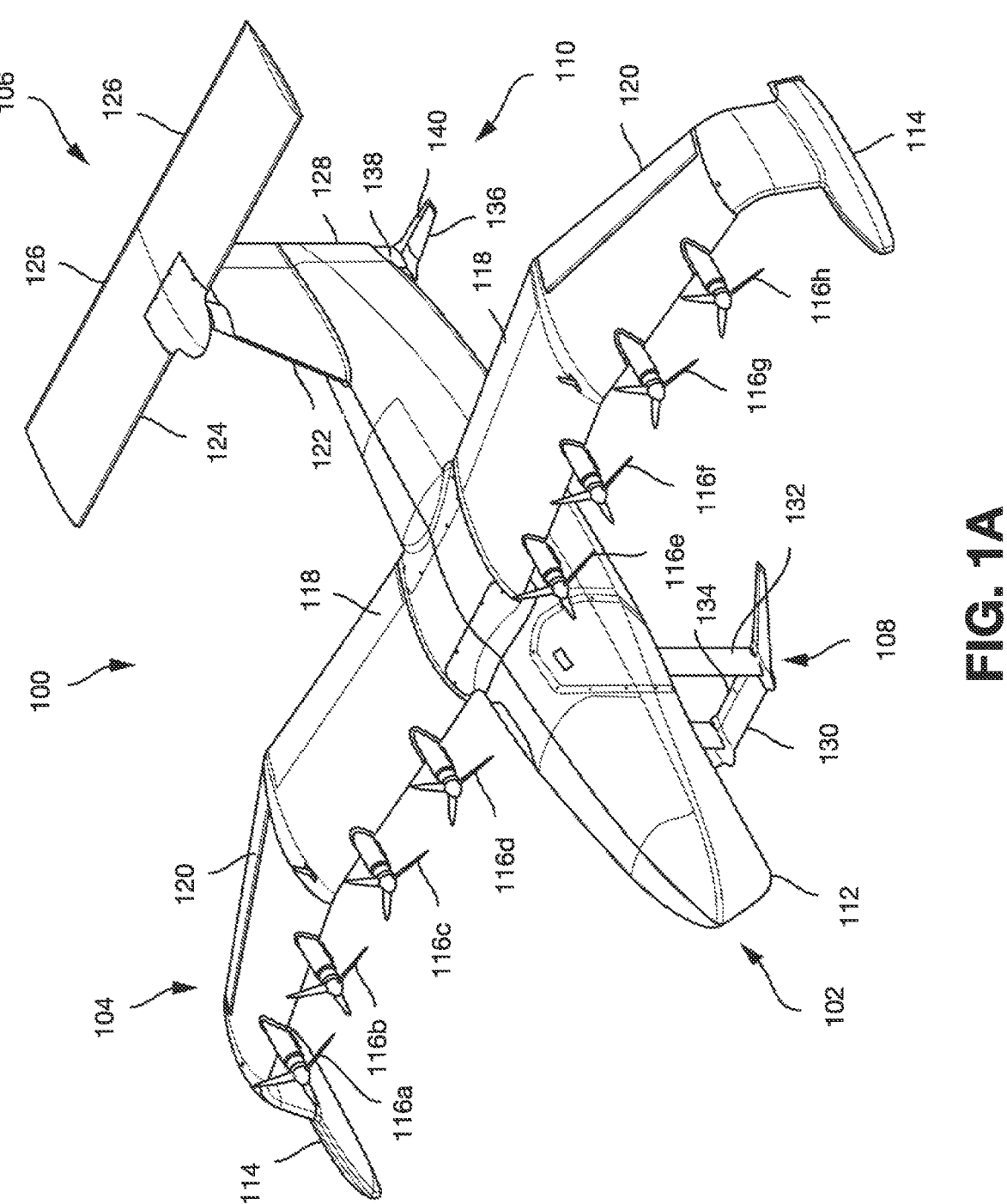
FIG. 1A depicts a perspective view of an example sea-glider, according to an example embodiment.

Example embodiments will now be described more fully with reference to the accompanying drawings and appended claims. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

I. Overview

In some applications as disclosed herein, the airborne vehicle according to the present teachings can be an aircraft for conventional fully aerodynamic flight, a wing-in-ground effect vehicle, a hydrofoil vehicle, or a combination thereof. In one embodiment, the airborne vehicle is a seaglider capable of transitioning from a hydrofoil phase of operation to airborne phase of operation. Therefore, it should be appreciated that the present teachings may find utility in a wide variety of applications. Accordingly, the present teachings should not be limited to any one type of vehicle unless specifically stated and/or claimed.

Therefore, in accordance with the present teachings, an airborne vehicle is provided having a body section; a main wing extending from the body section configured to generate aerodynamic lift, the main wing having one or more main wing control surfaces; and a tail assembly extending from the body section aft of the main wing. The tail assembly having a first tail member and a second tail member substantially parallel to each other. The first tail member having one or more control surfaces and the second tail member having one or more flap surfaces selectively deployable between a retracted position and an extended position. The flap surfaces being configured to increase a surface area and/or camber of the second tail member in the extended position.

Moreover, according to the principles of the present teachings, an airborne vehicle is disclosed having a multi-airfoil tail that provides a plurality of advantages over the prior art and may find utility in a wide range of applications, including, but not limited to, aircraft, wing-in-ground effect vehicles, seagliders, and other vehicles configured to travel based at least in part on aerodynamic lift. In some embodiments of the present teachings, the multi-airfoil empennage and associated structure (generally referred to as multi-foil tail) is disclosed in connection with wing-in-ground effect vehicles (WIGs) and/or seagliders. It should be understood that the following discussion is provided in connection with WIGs, but the present teachings are equally applicable in connection with fully airborne flight, both within and outside of ground effect, and in connection with transition to airborne phase of operation from one or more of hydrofoil-, hull-, and float-borne phases of operation, and therefore should not be regarded as limited to WIGs specifically unless otherwise noted or claimed.

The example WIGs described herein include features designed to create a more comfortable passenger experience and wider environmental operating range compared to existing WIGs. Advantages may include, but are not limited to, more comfortable takeoff and landing maneuvers, a smaller turning radius, a higher cruise efficiency, increased flight stability and safety, decreased operating costs, and the ability to operate comfortably in high seas and at low speeds in crowded harbors. The WIGs described herein are designed to fly over bodies of water and can therefore be used for transporting people and/or cargo between coastal destinations or between shore and offshore infrastructure. The WIGs can emit zero emissions during operation by utilizing an all-electric drivetrain that sources energy from a battery or hydrogen fuel cell system.

The WIGs described herein are configured to operate in at least three different operational modes including a first waterborne mode in which the hull of the WIG is at least partially submerged in water, a second waterborne mode in which the hull of the WIG is elevated above the water while one or more hydrofoils of the WIG are at least partially submerged in water, and an airborne mode in which the entire WIG is elevated above the water in ground-effect flight. Unlike existing vehicles, the WIGs described herein may operate in each of these three modes over extended distances and times.

In order to provide such improvements over existing vehicles, the WIGs described herein can combine multiple different technologies including (i) an electric powertrain in a distributed blown-wing configuration, (ii) a retractable hydrofoil system, (iii) digital flight control systems for stabilizing the WIG and controlling an altitude of the WIG near a water surface, and (iv) control systems for detecting and avoiding maritime traffic and obstacles. These technologies are explained in further detail below.

II. Example Wing-In-Ground Effect Vehicles

Figure 1B:
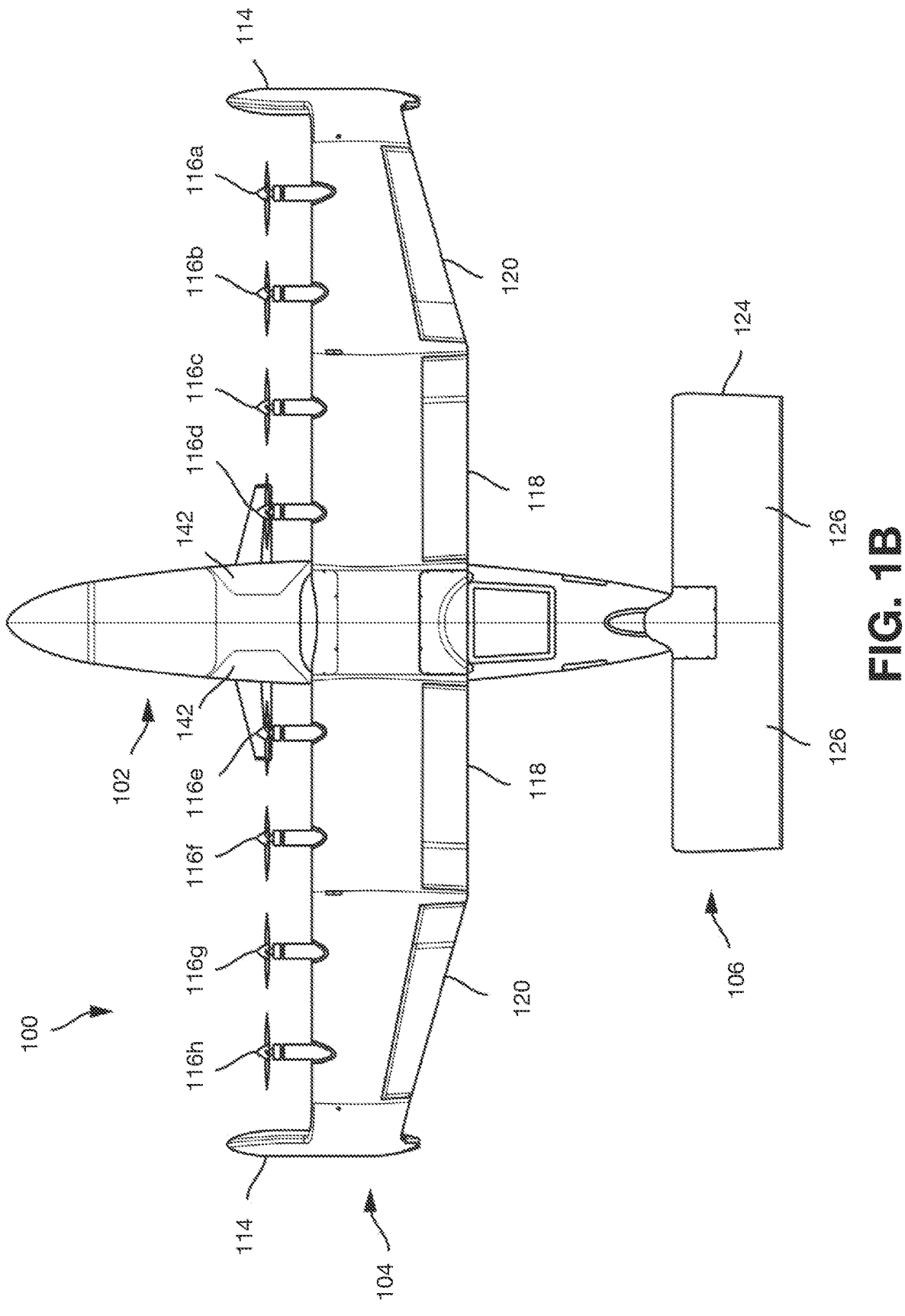
FIG. 1B depicts a top view of an example WIG of FIG. 1A.
Figure 1C:
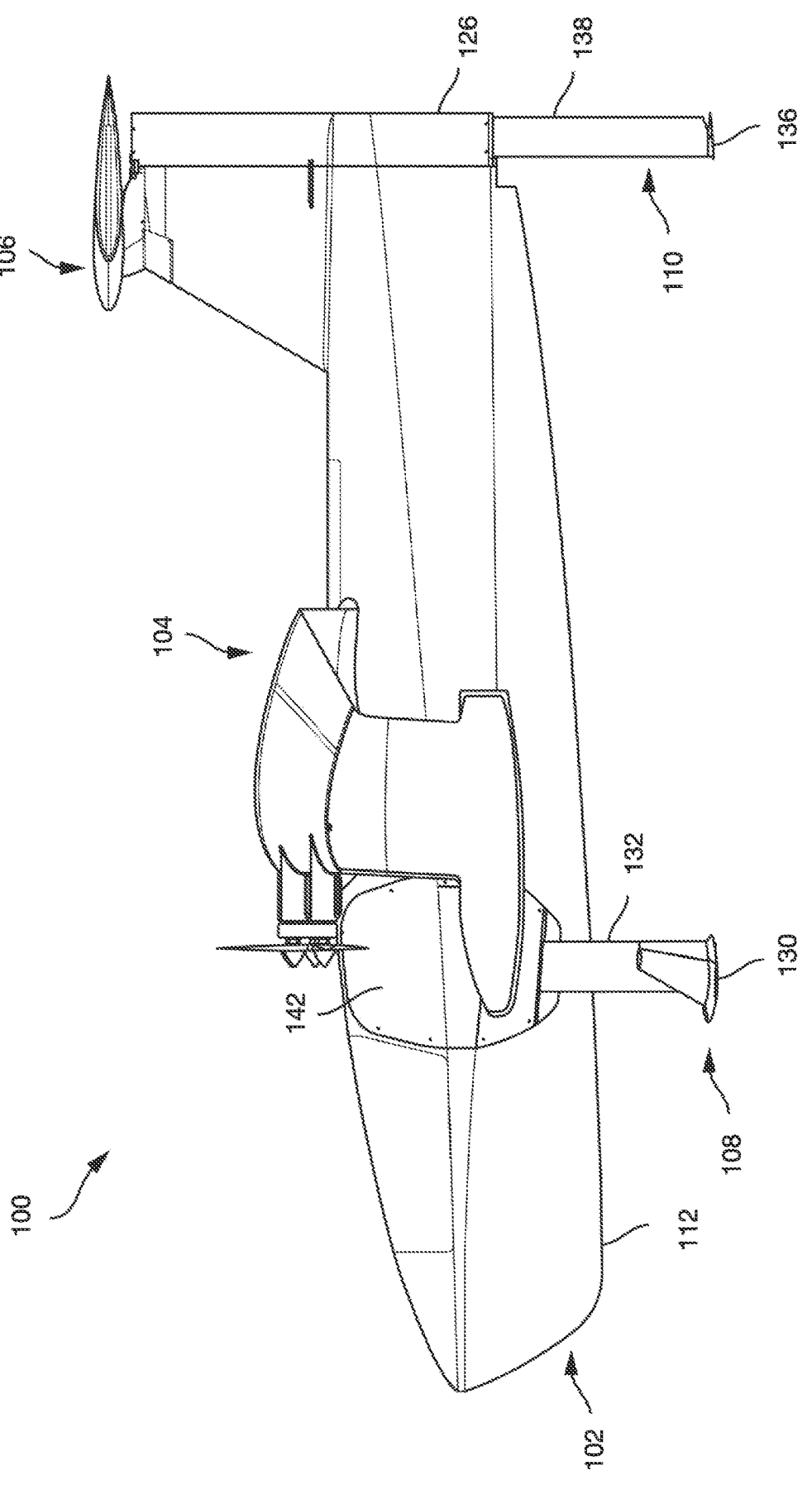
FIG. 1C depicts a side view of the example WIG of FIG. 1A.
Figure 1D:
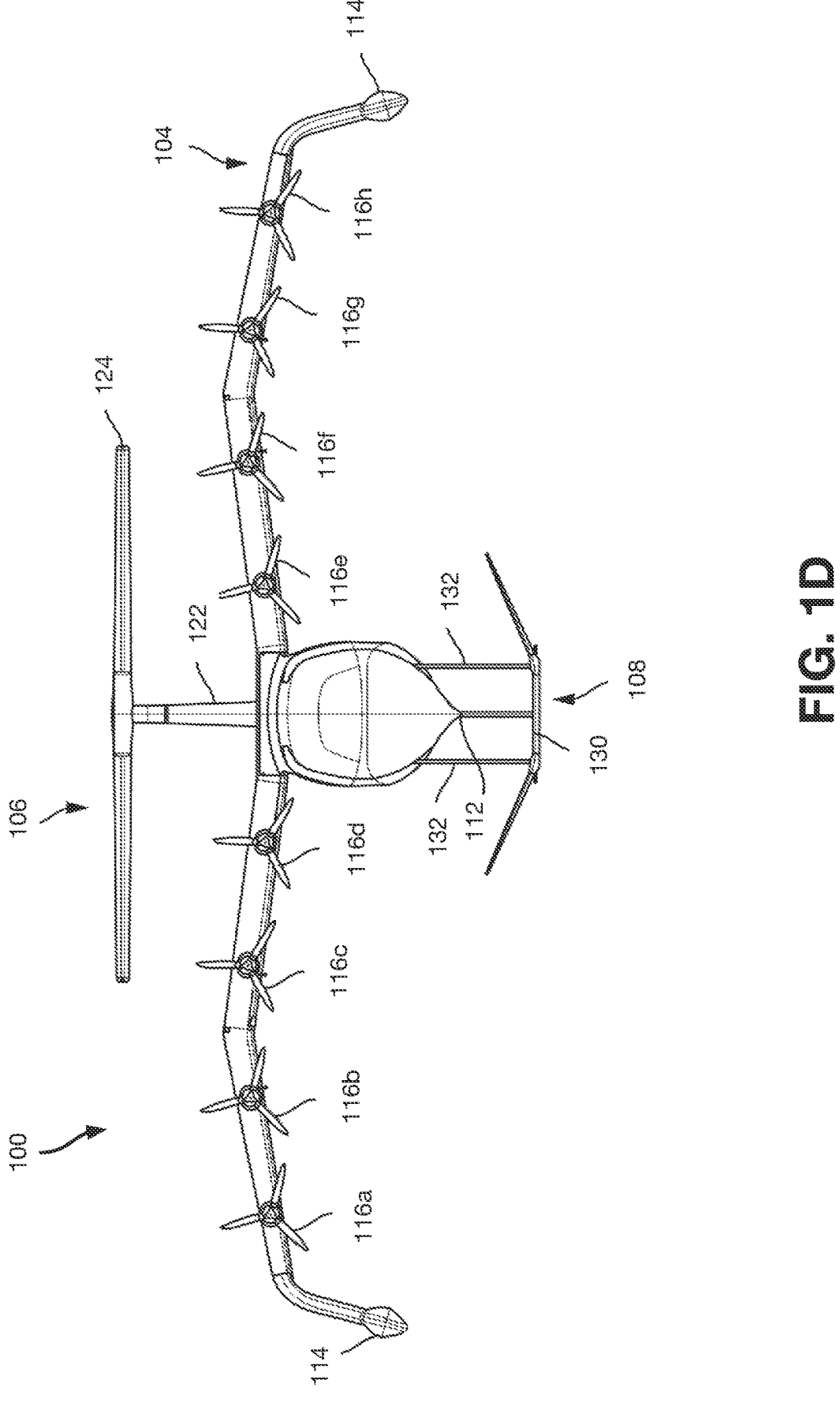
FIG. 1D depicts a front view of the example WIG of FIG. 1A.

FIGS. 1A-1D depict different views of an example WIG 100, including a perspective view in FIG. 1A, a top view in FIG. 1B, a side view in FIG. 1C, and a front view in FIG. 1D. As shown in these various views, the WIG 100 includes a hull 102, a main wing 104, a tail 106, a main hydrofoil assembly 108, and a rear hydrofoil assembly 110. It should be understood that in some examples WIG 100 can be modified for conventional airborne flight from airport surfaces through modification of the hull, main wing airfoil, and inclusion of a landing gear system. Accordingly, aspects of the present teachings are applicable to conventional airborne flight above ground-effect altitudes.

A. Hull

In line with the discussion above and as further described below, the WIG 100 is capable of operating in a first waterborne mode for extended periods of time, during which the hull 102 is at least partially submerged in water. As such, the hull 102 may be designed to be watertight, particularly for surfaces of the hull that contact the water during this first waterborne operational mode. Further, the hull 102, as well as the entirety of the WIG 100, is configured to be passively stable on all axes when floating in water. To help achieve this, the hull 102 may include a keel (or centerline) 112 which may provide improved stability and other benefits described below. And in some examples, the WIG 100 may include various mechanisms for adjusting the center of mass of the WIG 100 so that the center of mass aligns with the center of buoyancy of the WIG 100. One way to achieve this is to couple a battery system (described in further detail below in connection with FIG. 2) of the WIG 100 to one or more moveable mounts that may be moved by one or more servo motors or the like. A control system of the WIG 100 may detect a change in its center of buoyancy, for instance by detecting a rotational change via an onboard gyroscope, and the control system may responsively operate the servo motors to move the battery system until the gyroscope indicates that the WIG 100 has stabilized. Another way to adjust the center of mass of the WIG 100 so that the center of mass aligns with the center of buoyancy of the WIG 100 is to include a ballast system for pumping water or air to various tanks distributed throughout the hull 102 of the WIG 100, which may allow for adjusting the center of mass of the WIG 100 in a similar manner as moving the battery system. Other example systems may be used to control the center of mass of the WIG 100 as well.

Additionally, the hull 102 may be designed to reduce drag forces when both waterborne and airborne. For instance, the hull 102 may have a high length-to-beam ratio (e.g., greater than or equal to 8), which may help reduce hydrostatic drag forces when the WIG 100 is under forward waterborne motion. In some examples, the keel 112 may be curved or rockered to improve maneuverability when waterborne. Further, the hull 102 may be designed to pierce the surface of waves (e.g., to increase passenger and crew comfort) by including a narrow, low-buoyancy bow portion of the hull 102.

B. Wing and Distributed Propulsion System

The main wing 104 may also include features to improve stability of the WIG 100 during waterborne operation. For instance, as shown in FIGS. 1A-1D, the main wing 104 may include an outrigger 114 at each end of the main wing 104. The outriggers 114 (which are sometimes referred to as "wing-tip pontoons") are configured to provide a buoyant force to the main wing 104 when submerged or when otherwise in contact with the water. As depicted in the front view of the WIG 100 in FIG. 1D, the main wing 104 may be designed to have a gull wing shape such that the outriggers 114 at the ends of the main wing 104 are at the lowest point of the main wing 104 and are positioned approximately level with (or slightly above) a waterline of the hull 102 when the hull 102 is waterborne.

As best shown in the top view of the WIG 100 in FIG. 1B, the main wing 104 is designed to have a high aspect ratio, which represents the ratio of the span of the main wing 104 to the mean chord of the main wing 104. In some examples, the aspect ratio of the main wing 104 is greater than or equal to five, or greater than or equal to six, but other example aspect ratios are possible as well.

High aspect ratio wings may provide certain drawbacks when compared to low aspect ratio wings, including reduced pitch stability due to a shorter mean chord. Previous WIGs have opted for low aspect ratio wings to address these instability issues. For instance, when a WIG is flying in ground-effect, there is an increase in static pressure underneath the wings, which shifts the aerodynamic center of the WIG backward and causes aerodynamic instability in the WIG's pitch axis. Low aspect ratio wings focus the lift force on the leading edge of the wing, and when the WIG pitches upward the leading edge also pitches upward, causing the WIG to leave ground-effect, lose lift, and settle back down. However, while this low aspect ratio wing design addressed instability issues, it significantly reduced the aerodynamic efficiency of these previous WIG designs.

Another drawback of high aspect ratio wings, generally, is their reduced maneuverability due to a lower roll angular acceleration. And the maneuverability of high aspect ratio wings may be further reduced for WIGs. For instance, when operating in a ground-effect flight mode over a water surface, a WIG with a high aspect ratio wing may be close enough to the water surface that too much roll could cause the wing to collide with the water surface. To address these and other issues, the WIG 100 disclosed herein may include various additional mechanisms, as described in further detail below, for improving its maneuverability to compensate for the reduced maneuverability resulting from the high aspect ratio of the main wing 104.

While high aspect ratio wings may provide various drawbacks, such as those identified above, high aspect ratio wings may also provide a number of improvements over low aspect ratio wings, including increased roll stability and increased efficiency resulting from higher lift-to-drag ratios. Further, another benefit of a high aspect ratio wing is that it provides a longer leading edge for mounting a distributed propulsion system along the wing. Arranging propulsion systems in this distributed manner along the wing provides a "blown-wing" propulsion system in which the propulsion systems can increase the velocity of air moving over the wing, and the increased air velocity over the main wing increases the lift generated by the main wing. This increase in lift can enable the WIG to takeoff and become airborne at slower speeds, which can be especially advantageous for takeoff of waterborne WIGs. For instance, waterborne WIGs may be subjected to various forces that limit their takeoff speed, such as water resistance and reduced lift caused by cavitation when operating on one or more hydrofoils, as explained in further detail below.

Previous WIG designs have typically incorporated low aspect ratio wing designs, such as inverse-delta wing designs. Such low aspect ratio wings have been used to increase the pitch stability of the WIG when flying in ground effect. In connection with low aspect ratio wings, previous WIG designs have also incorporated various ram-air methods that involve using the primary propulsion system to push air under the WIG between the wing and the water surface to artificially create additional lift.

Unlike previous designs that have used ram-air methods to assist with takeoff, the WIG 100 disclosed herein incorporates a distributed blown-wing propulsion system that assists with takeoff by allowing for slower takeoff speeds. As shown in FIGS. 1A-1D, the main wing 104 includes a number of electric motor propeller assemblies 116 distributed across a leading edge of the main wing 104. Arranging the propeller assemblies 116 in this manner can increase the velocity of air moving over the main wing 104, and the increased air velocity over the main wing 104 increases the lift generated by the main wing 104. This increase in lift can enable the WIG 100 to take off and become airborne at slower vehicle speeds.

The distributed blown-wing arrangement of the electric motor propeller assemblies 116 improves upon arrangements in existing WIGs, which have relied on one or more liquid-fueled engines as the primary propulsion source during operation. Liquid-fueled engines are typically much heavier, more complex, and larger than electric motors, so any benefits of additional lift provided by a distributed blown-wing arrangement of liquid-fueled engines may be outweighed by the additional weight and complexity of multiple engines. Further, coupling an array of propellers to the liquid-fueled engines may require multiple rotating shafts and gearboxes, thereby increasing the mechanical complexity and resultant maintenance costs to the point of unfeasibility. Using the electric motor propeller assemblies 116, however, alleviates such issues. Each individual electric motor propeller assembly 116 can be controlled by an electronic speed controller and powered by an onboard battery system, such as, for example, a lithium-ion, magnesium-ion, or lithium-sulfur system, or by some other onboard electrical supply system, such as a fuel cell or a centralized liquid-fueled electricity generator. In some examples, the onboard electrical supply system may include multiple systems for supplying power during different operational modes, such as a first battery system configured to deliver large amounts of power during takeoff and a second system with a higher energy density but lower peak power capability for delivering sustained lower power during cruise operation (e.g., during hydrofoil waterborne operation or during airborne operation, each of which are described in further detail below).

Figure 2:
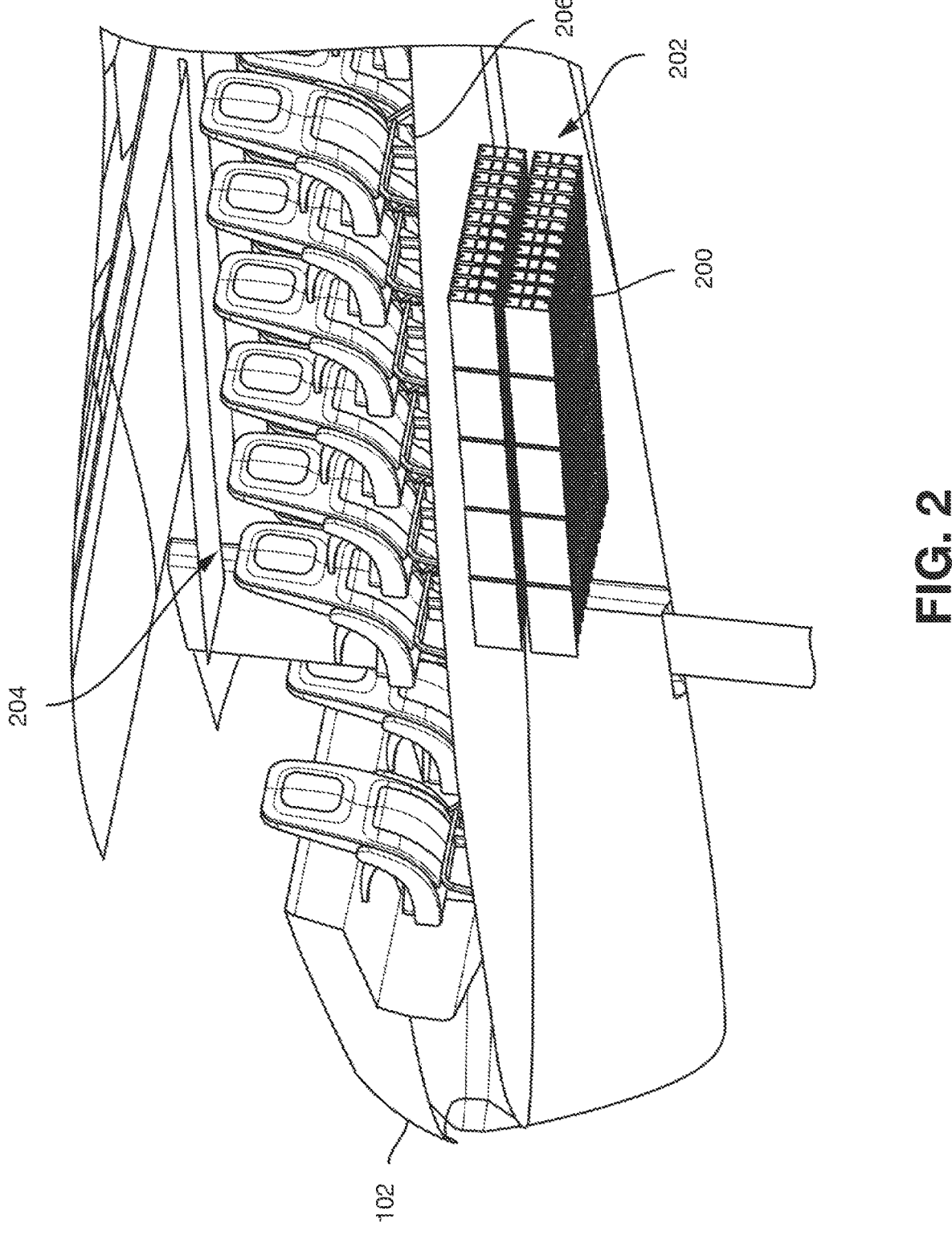
FIG. 2 depicts a battery system of the example WIG.

An example onboard battery system 200 is depicted in FIG. 2. As shown, the battery system 200 may be arranged in a protected area 202 of the hull 102 below a passenger seating area 204. The battery system 200 may be separated from the passenger seating area 204 by a firewall 206 to protect the passengers from harm if a thermal runaway occurs. In some examples, additional or alternative protective measures may be taken as well. For instance, the WIG 100 may include one or more mechanisms for flooding the battery system 200 upon detecting a thermal runaway or a fire in the protected area 202. In order to flood the battery system 200, the WIG 100 may include a battery management system comprising voltage and/or thermal sensors for detecting thermal runaway or some other fire detection system for detecting a fire in the protected area 202. Further, the hull 102 may include one or more valves or other controllable openings in the hull 102. Responsive to detecting a fire in the protected area 202 or thermal runaway in the battery system 200, a control system of the WIG 100 may open the valves or other controllable openings in the hull 102 to expose the protected area 202 and the battery system 200 to the water in which the WIG is floating.

A water-based flooding system as described above would only work while the WIG 100 is waterborne, so other measures may be taken to account for fires or thermal runaway during airborne operation. As one example, any controllable openings in the hull 102 may be configured to be large enough to jettison the battery system 200 out of the hull 102 through the openings. The battery system 200 may be configured such that the weight of the battery system 200 provides sufficient force to jettison the battery system 200 out of the hull 102 when the hull 102 is opened, or the WIG 100 may include an actuator or some other mechanism to jettison the battery system 200 out of the hull 102. As another example, the WIG 100 may include an inert gas fire suppression system for reducing the amount of oxygen in the protected area 202 and suppressing any fires in response to detecting a fire in the protected area 202 or thermal runaway in the battery system 200. Other examples are possible as well.

In other examples, the WIG 100 may take measures to become waterborne in response to detecting a fire in the protected area 202 or thermal runaway in the battery system 200. For instance, responsive to making such a detection, the control system of the WIG 100 may determine an operational state of the WIG 100, including whether the WIG 100 is operating in a hull-borne mode, a hydrofoil-borne mode, or a wing-borne mode (each of which are described in further detail below). In response to determining that the WIG 100 is operating in a hull-borne mode, the control system may flood the battery system 200 upon detecting a thermal runaway or a fire in the protected area 202 as described above. If, however, the control system determines that the WIG 100 is operating in a hydrofoil-borne mode or a wing-borne mode, the control system may cause the WIG 100 to transition to the hull-borne mode upon detecting a thermal runaway or a fire in the protected area 202 and then flood the battery system 200. Techniques for transitioning between operational modes are described in further detail below in connection with FIG. 6.

The positioning of the electric motor propeller assemblies 116 along the leading edge of the main wing 104 may be determined based on a variety of factors including, but not limited to, (i) the required total thrust for all modes of operation of the WIG 100, (ii) the thrust generated by each individual propeller assembly 116, (iii) the radius of each propeller in the respective propeller assemblies 116, (iv) the required tip clearance between each propeller and the surface of the water, and (v) the additional freestream velocity over the main wing 104 required for operation. As shown in FIGS. 1A-1D, the number of propeller assemblies 116 is symmetrical across both sides of the hull 102. The propeller assemblies 116 may all be identical, or they may have different propeller radii or blade configurations along the span so long as the configuration is symmetrical across the hull 102. One advantage for having different propeller assembly 116 radii is allowing adequate propeller tip clearance from the water or vehicle structure. An advantage of having different blade configurations on the propeller assemblies 116 is to allow some propellers to be optimized for different operational conditions, such as airborne cruise. The propeller placement and configuration may vary to increase the airflow over the main wing 104 or tail system 106 to improve controllability or stability. While FIGS. 1A-1D depict an example WIG 100 having eight total propeller assemblies 116, the actual number of propeller assemblies 116 can vary based on the requirements of the WIG 100.

In some examples, the respective propeller assemblies 116 may have different pitch settings or variable pitch capabilities based on their position on the main wing 104. For instance, a subset of the propeller assemblies 116 may have fixed-pitch propellers sized for cruise speeds, while the remainder of the propeller assemblies 116 can have fixed-pitch propellers configured for takeoff, or can allow for varying of the propeller's pitch. Additionally, different propeller assemblies 116 may be turned off or have reduced rotational speeds during different modes of operation. For instance, during waterborne operation, one or more of the propeller assemblies 116 may be turned off or have reduced rotational speeds in a manner that generates asymmetrical thrust. This may create a yawing moment on the WIG 100, allowing the WIG 100 to turn without large bank angles and increasing the turning maneuverability of the WIG 100. For instance, in order to yaw right, the WIG 100 may increase the rotational speeds of the propellers of one or more of propeller assemblies 116*e-h* while decreasing the rotational speeds of the propellers of one or more of propeller assemblies 116*a-d*. Similarly, in order to yaw left, the WIG 100 may increase the rotational speeds of the propellers of one or more of propeller assemblies 116*a-d* while decreasing the rotational speeds of the propellers of one or more of propeller assemblies 116*e-h*.

The main wing 104 may further include one or more aerodynamic control surfaces, such as flaps 118 and ailerons 120, which may comprise movable hinged surfaces on the trailing or leading edges of the main wing 104 for changing the aerodynamic shape of the main wing 104. The flaps 118 may be configured to extend downward below the main wing 104 in order to reduce stall speed and create additional lift at low airspeeds, while the ailerons 120 may be configured to extend upward above the main wing 104 in order to decrease lift on one side of the main wing 104 and induce a roll moment in the WIG 100. In some examples, the ailerons 120 may be additionally configured to extend downward below the main wing 104 in a flaperon configuration to help the flaps 118 generate additional lift on the main wing 104, which may be used to either create a rolling moment or additional balanced lift depending on coordinated movement of both ailerons. The flaps 118 and ailerons 120 may each include one or more actuators for raising and lowering the flaps 118 and ailerons 120. The flaps 118 may include, for example, one or more of plain flaps, split flaps, slotted flaps, Fowler flaps, slotted Fowler flaps, Gouge flaps, Junkers flaps, or Zap flaps. Further, the flaps 118 (and the ailerons 120 when configured as flaperons) should be positioned so that they are in the wake of one or more of the propeller assemblies 116. The ailerons 120 may be positioned so that they are in the wake of one or more of the propeller assemblies 116 in order to increase the effectiveness of the ailerons at low forward velocities. Some of the propeller assemblies 116 may be positioned so that no ailerons 120 are in their wake to increase thrust on the outboard wing during a turn without inducing adverse yaw. For example, in a left turn, a normal airplane would have adverse yaw to the right as the right aileron is deflected down, increasing drag. In the present disclosure, however, the right propeller assembly outboard of the right aileron may have its thrust increased relative to the respective left propeller assembly, initiating a turn without adverse yaw.

C. Tail System

In some examples as illustrated in FIGS. 1A-1D, the tail 106 includes a vertical stabilizer 122, a horizontal stabilizer 124, and one or more control surfaces, such as elevators 126. Similar to the flaps 118 and ailerons 120, the elevators 126 may comprise movable hinged surfaces on the trailing or leading edges of the horizontal stabilizer 124 for changing the aerodynamic shape of the horizontal stabilizer 124 to control a pitch of the WIG 100. The horizontal stabilizer 124 may be combined with the elevator 126, creating a fully articulating horizontal stabilizer (e.g. a stabilator). Raising the elevators 126 above the hinge point creates a net downward force on the tail system and causes the WIG 100 to pitch upward. Lowering the elevators 126 below the hinge point creates a net upward force on the horizontal stabilizer 124 and causes the WIG 100 to pitch downward. The elevators 126 may include actuators, which may be operated by a control system of the WIG 100 in order to raise and lower the elevators 126.

In the example illustrated in FIGS. 1A-1D, the tail 106 may further include a rudder 128. The rudder 128 may comprise a movable hinged surface on the trailing edge of the vertical stabilizer 122 for changing the aerodynamic shape of the vertical stabilizer 122 to control the yaw of the WIG 100 when operating in an airborne mode. In some examples, the rudder 128 may additionally change a hydrodynamic shape of the hull 102 to control the yaw of the WIG 100 when operating in a waterborne mode. In order to facilitate such hydrodynamic control, the rudder 128 may be positioned low enough on the tail 106 that the rudder 128 is partially or entirely submerged when the hull 102 is floating in water. Namely, the rudder 128 may be positioned partially or entirely below a waterline of the hull 102. The rudder 128 may include one or more actuators, which may be operated by a control system of the WIG 100 in order to rotate the hinged surface of the rudder 128 to the left or right of the vertical stabilizer 122. Actuating the rudder 128 to the left (relative to the direction of travel) causes the WIG 100 to yaw left. Actuating the rudder 128 to the right (relative to the direction of travel) causes the WIG 100 to yaw right. As such, the rudder 128 may be used in combination with any of the other mechanisms disclosed herein for controlling the yaw of the WIG 100, including in combination with the ailerons 120 during airborne operation and in combination with varying the rotational speeds of different ones of the propeller assemblies 116 to help improve maneuverability of the WIG 100 during waterborne operation.

Figure 1E:
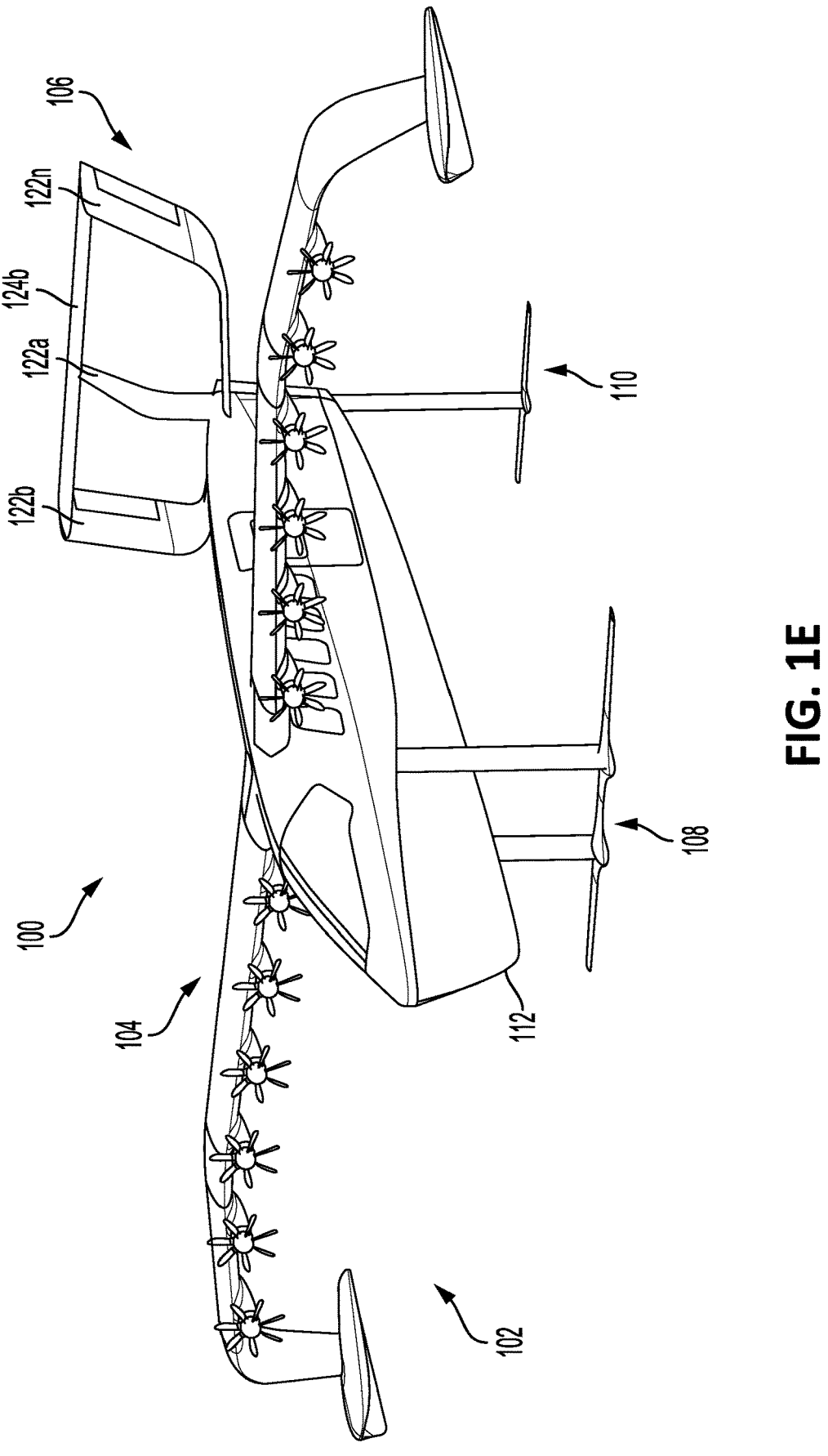
FIG. 1E depicts a front perspective view of an example WIG having a multi-airfoil tail, according to an example embodiment.
Figure 1F:
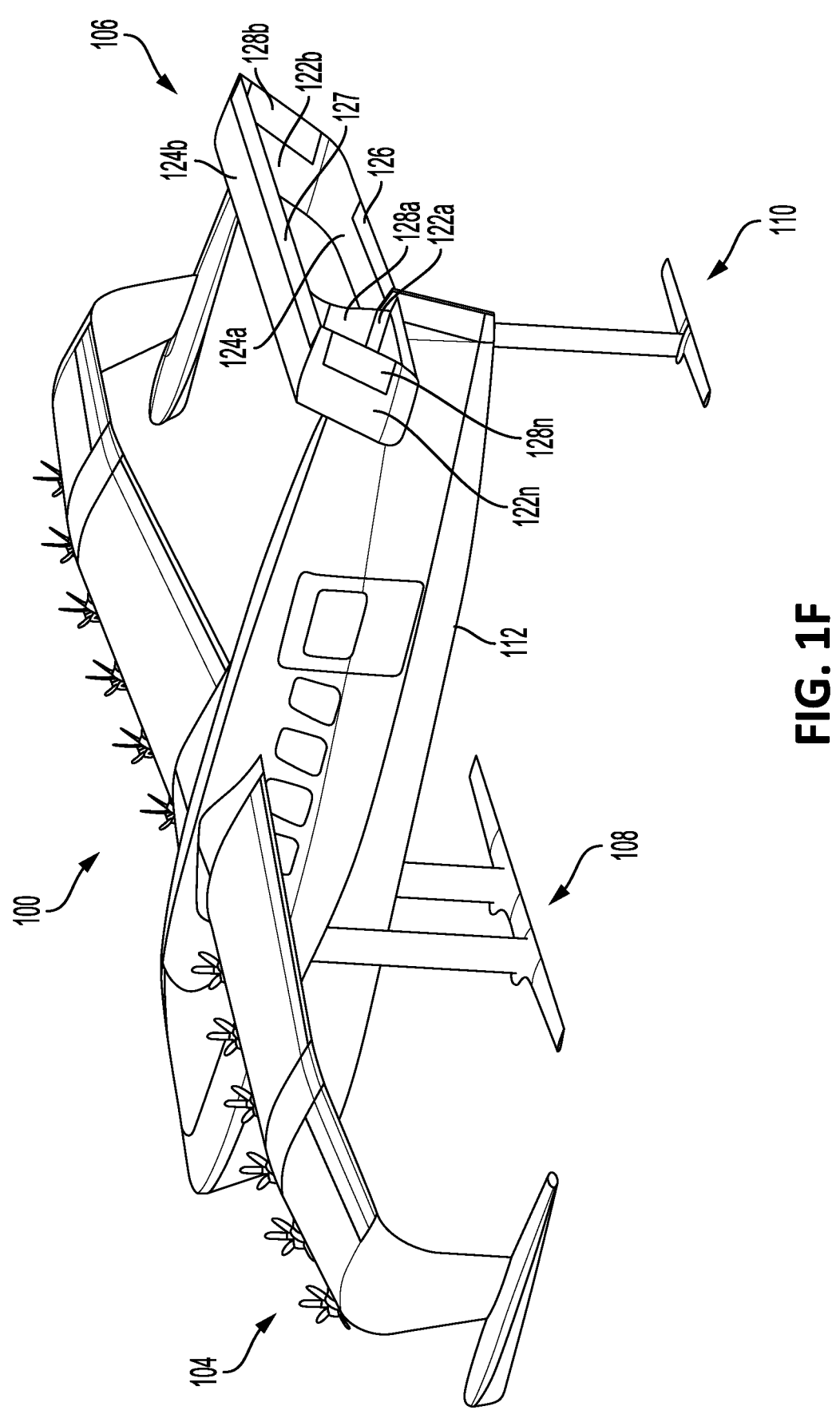
FIG. 1F depicts a rear perspective view of the example WIG of FIG. 1E.
Figure 1G:
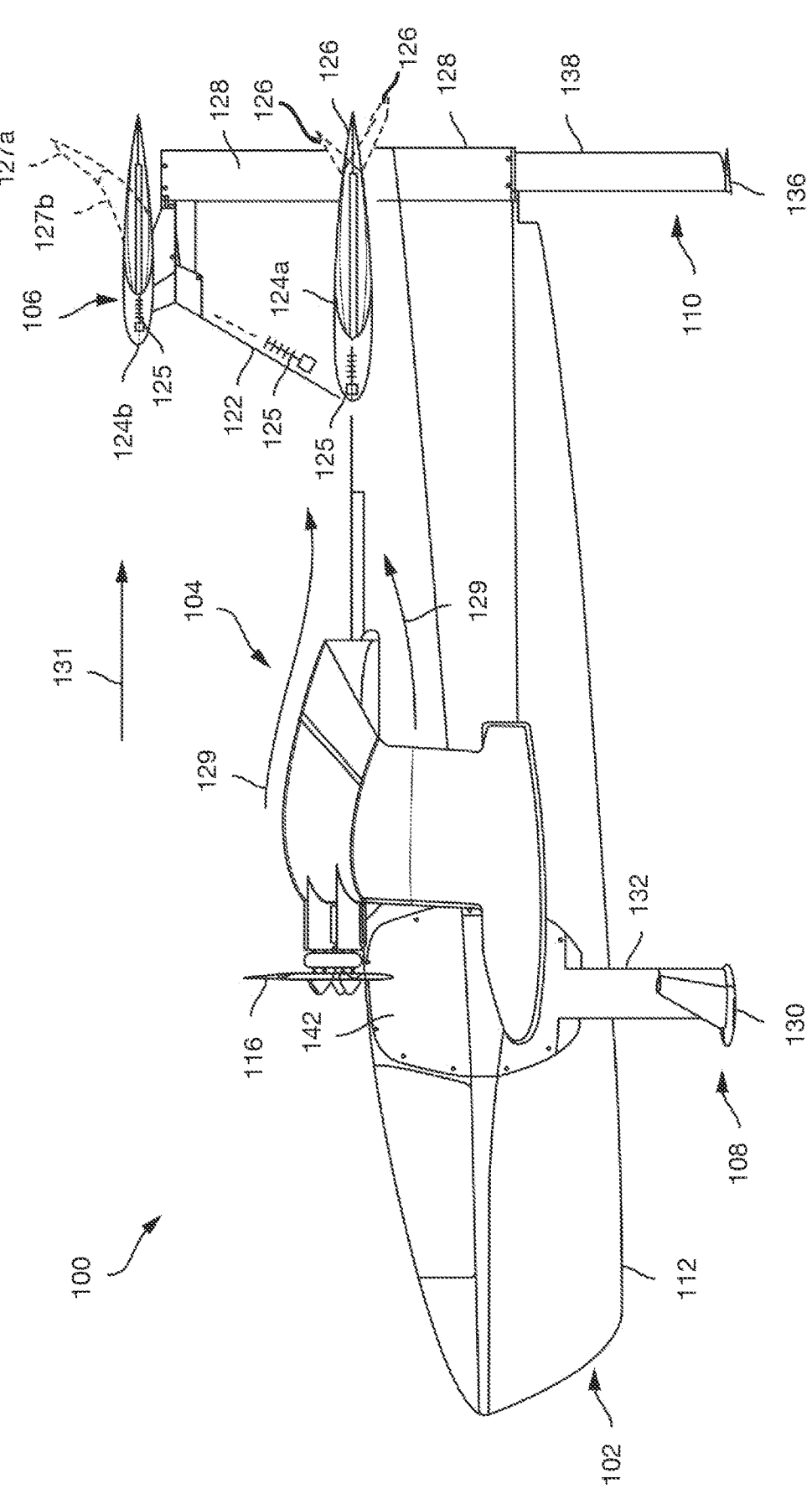
FIG. 1G depicts a side view of the example WIG of FIG. 1E.

In some examples, as illustrated in FIGS. 1E-1G, the tail 106 includes one or more vertical stabilizers 122*a*, 122*b*, 122*n*, one or more horizontal stabilizers 124*a*, 124*b*, one or more control surfaces, such as elevators 126, and one or more tail flaps 127*a*, 127*b* for enhanced pitch control configured to exert enhanced net downward force on the tail system. It should be understood that although FIGS. 1E-1G show only two horizontal stabilizers and two tail flaps, it is contemplated that more than two of each can be used within the scope of the present teachings. In some applications it has been found that the transition from waterborne operation to airborne or wing-borne operation can require a larger pitching moment to overcome the larger drag forces existing between the hull 102 and/or the hydrofoil assemblies 108, 110 and the water This phenomenon can further occur in wheeled aircraft configured for short takeoff and landing (STOL) operations. In this way, at low airspeeds, aerodynamic forces in conventional designs fail to produce sufficient downward force to permit sufficient pitching moment. To provide sufficient pitching moment to pitch the WIG 100 upward, a conventional solution would be to increase the span of the tail so that the elevator generates more force; however, a resultant consequence of increasing the span of the tail is that the entire tail must be stronger and heavier, which can result in undesired reduction of payload and efficiency. However, the present configuration provides improved performance by providing a tail 106 having a first horizontal stabilizer 124*a* and a second horizontal stabilizer 124*b*. It should be understood that one or more additional horizontal stabilizers can be used.

In some examples, a first horizontal stabilizer 124*a* can be a lower horizontal stabilizer relative to a second horizontal stabilizer 124*b*. However, it should be appreciated that the horizontal stabilizers in some examples can be interchanged for performance purposes (e.g., the disclosed structure of the first horizontal stabilizer 124*a* can be incorporated in the upper horizontal stabilizer and the disclosed structure of the second horizontal stabilizer 124*b* can be incorporated in the lower horizontal stabilizer). In some non-limiting examples, structure, shape, and/or performance of each horizontal stabilizer can be tailored as desired such that the lower horizontal stabilizer (in this example, the first horizontal stabilizer 124*a*) is more likely to experience aerodynamic effect from being in the wake of the blown-wing propulsion system disclosed herein or associated wake produced by alternative propulsion systems. In this way, greater aerodynamic control and/or downward lift can be generated during desired phases of operation.

Figure 1H:
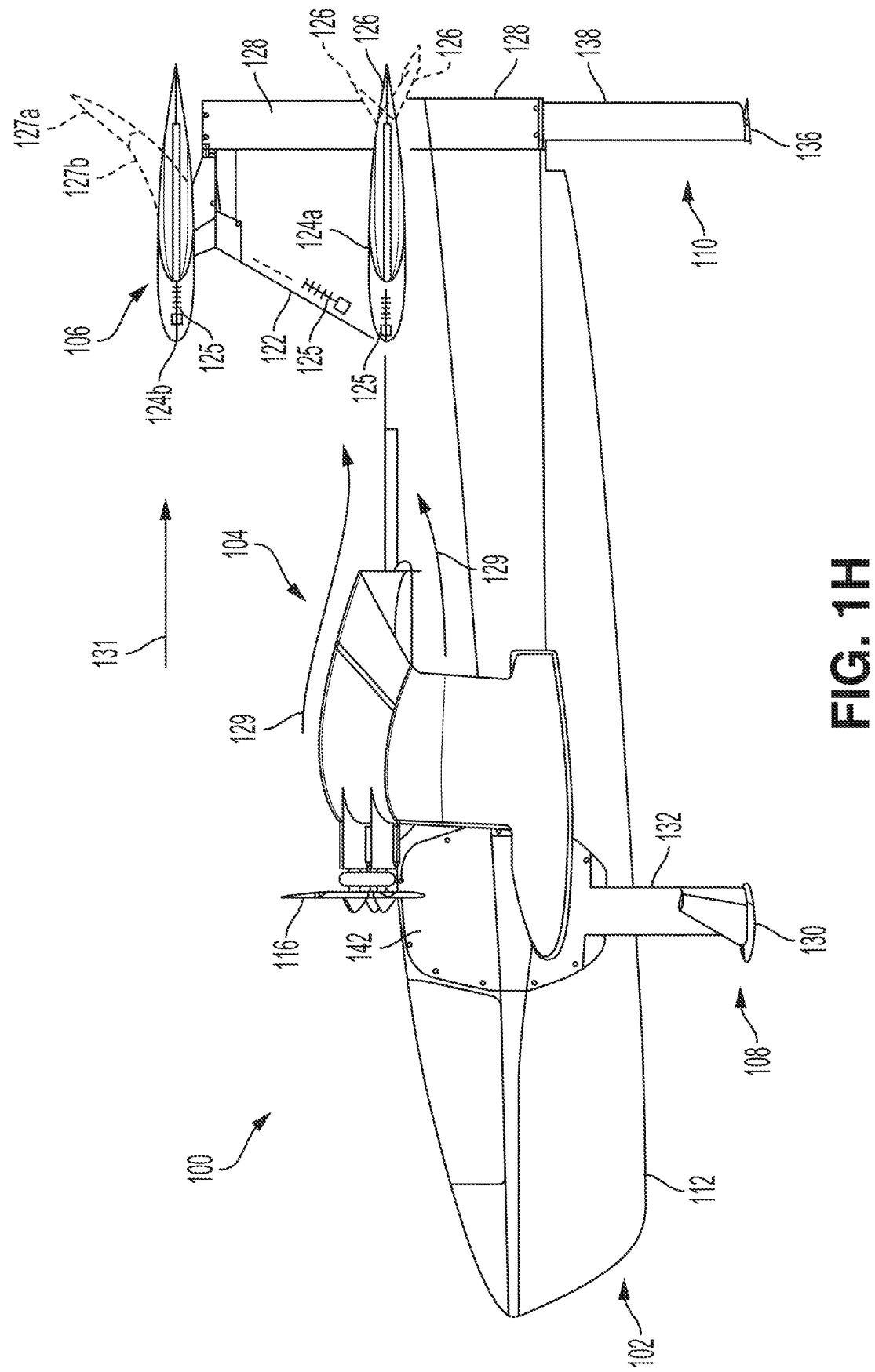
FIG. 1H depicts another side view of the example WIG of FIG. 1E with an alternative tail configuration.

In some examples, horizontal stabilizers 124*a,* 124*b* can include one or more aerodynamic control surfaces, such as tail flaps 127 and elevators 126, which may comprise movable hinged surfaces on the trailing or leading edges of the horizontal stabilizer 124 for changing the aerodynamic shape of the respective horizontal stabilizer 124. It should be recognized that at least one of the horizontal stabilizers 124*a,* 124*b* can be sized, shaped, and/or spaced relative to a second of the horizontal stabilizers 124*a,* 124*b* to enhance or minimize the aerodynamic effect on the adjacent stabilizers. In this way, the aerodynamic flow, pressures, and/or forces can be used to improve the efficiency or effectiveness of the adjacent stabilizer. In some examples, at least one of the horizontal stabilizers 124*a,* 124*b* can be actuated in an opposing direction. In some embodiments, at least one of the horizontal stabilizers 124*a,* 124*b* can define a ratio of a surface area of the first horizontal stabilizer to a surface area of the second horizontal stabilizer in the range of 0.9 to 1.6. In some exemplary configurations and by non-limiting example, the surface area of the first horizontal stabilizer is 5.7 m2, the surface area of the second horizontal stabilizer is 3.9 m2, both have a chord of about 1 m and a vertical separation of 1.8 m. For example, FIG. 1H depicts an example of the WIG 100 where the horizontal stabilizers 124*a* and 124*b* have substantially the same chord length. In some embodiments, a vertical separation distance between the first horizontal stabilizer and the second horizontal stabilizer is in the range of 0.25 to 0.75 of the lower horizontal stabilizer span. In some embodiments, a vertical separation distance can be dependent on the required rudder authority and thus elevator size (driven by, e.g., yaw stability, or the need to counteract asymmetric thrust following powerplant failure). In some embodiments, a sweep offset moves the center of pressure further aft from the center of gravity, thus allowing the airfoil of the horizontal stabilizer to have less surface area overall, thus being smaller and lighter. In some embodiments, a dihedral in the bottom surface of the horizontal stabilizer adds stability. In some embodiments, the box tail design itself increases the efficiency due to the elimination of wingtip vortices of a typical tail. In some embodiments, a lower horizontal stabilizer may have approximately 15% thickness-to-chord ratio to support the weight of the upper components, whereas the vertical and upper surfaces may be thinner, such as, for example, 10% thickness-to-chord ratio due to reduced structural load requirement, which enables the upper horizontal stabilizer to be more efficient (lower drag). It should be appreciated that the left and right elevator surfaces 126 can be controlled independently and/or differentially to create a rolling moment, thereby enabling the wing ailerons 120 to be made smaller. The smaller wing ailerons 120 further enable larger flaps 118. It should be appreciated that in some embodiments, using the vertical control surfaces 128*a,* 128*b,* 128*n* can change the pressure distribution across the elevator 126, for example, commanding a left 5 degree deflection in the left vertical control surface may move the mean pressure distribution left/right by a percentage of the elevator width.

The tail flaps 127 may be configured to selectively extend upward above the horizontal stabilizer 124 for changing a surface area, camber, aspect ratio, and/or shape of the horizontal stabilizer 124. The tail flaps 127 may include, for example, one or more of plain flaps, split flaps, slotted flaps, Fowler flaps, slotted or double-slotted Fowler flaps, Gouge flaps, Junkers flaps, or Zap flaps. That is, in some examples, tail flaps 127 serve to change an angle of attack of the horizontal stabilizer 124, change a chord line of the horizontal stabilizer 124, change a surface area of the horizontal stabilizer 124, and/or otherwise increase the net effective downwardly directed lift of the horizontal stabilizer 124. Such configurations effectively reduce the speed at which the horizontal stabilizer 124 becomes aerodynamically effective by creating additional net downward force at low airspeeds to aid in exerting a nose up pitching moment of the WIG 100. The elevators 126 may be configured for changing the aerodynamic shape of the horizontal stabilizer 124 to further control or vary a pitch of the WIG 100.

In operation, tail flaps 127 can be deployed (e.g., extended as depicted in 127*a* and 127*b* with dashed lines in FIG. 1G) for takeoff (e.g., transition from hydrofoil-borne mode to airborne mode) and landing (e.g., transition from airborne mode to hull-borne mode) to generate additional downforce on the tail system when additional pitch-up moment is required. Tail flaps 127 can be stowed (e.g., retracted as depicted in FIGS. 1E-1F) for other phases of operation, such as hull-borne mode to reduce downforce on the tail system and reduce drag.

In some examples, the elevators 126 may be additionally configured to extend upward above the horizontal stabilizer 124 in a flaperon-like configuration (yet with elevators, rather than ailerons) to help the tail flaps 127 generate additional downward force on the horizontal stabilizer 124, which may be used to either create a pitching moment or additional balanced downward force. The tail flaps 127 and elevators 126 may each include one or more actuators 125 for raising and lowering the tail flaps 127 and elevators 126, singly or in combination. The actuators 125 can comprise any system configured to selectively actuate the associated system, such as but not limited to a flap track system (integrated into vertical stabilizers 122*a,* 122*b,* 122*n*, which can reduce complex hinge systems or external arms, thereby reducing wetted area and excrescences drag), an electric servo motor mounting within the vertical stabilizers 122*a,* 122*b,* 122*n* and/or horizontal stabilizers 124*a,* 124*b,* and/or a central vertical strut system generally mounted in the hull 102 or the fuselage of the WIG 100 (to provide the potential for reduced cross-sectional area and associated drag).

Further, in some examples as depicted in FIG. 1G, the elevators 126 and/or the tail flaps 127 can be positioned so that they are in the wake 129 of one or more of the propeller assemblies 116 of main wing 104. The elevators 126 and/or the tail flaps 127 may be positioned so that they are in the wake 129 of one or more of the propeller assemblies 116 in order to increase the effectiveness of the elevators at low forward velocities. In some examples, the propeller assemblies 116 may be positioned so that no elevators 126 and/or tail flaps 127 are in the wake 129 to ensure consistent and/or predictable aerodynamic forces, independent of power application, are exerted during critical operational phases. In some examples, the propeller assemblies 116 may be positioned so that the elevators 126 are in their wake and the tail flaps 127 are not in the wake 129 (e.g., above the wake 129) and are exposed to clean air 131. It should be understood that positioning of the tail flaps 127 in the second horizontal stabilizer 124*b*, or at a distance above the center of gravity of the WIG 100, will have the added unexpected benefit of creating additionally nose-up pitching moment as a result of induced drag acting about the center of gravity causing the WIG 100 to pitch upward.

Similar to the flaps 118 and the ailerons 120 of the main wing 104, the elevators 126 may comprise movable hinged surfaces on the trailing or leading edges of the horizontal stabilizer 124 for changing the aerodynamic shape of the horizontal stabilizer 124 to control a pitch of the WIG 100. The horizontal stabilizer 124 may be combined with the elevator 126, creating a fully articulating horizontal stabilizer (e.g., a stabilator). Raising the elevators 126 above the hinge point creates a net downward force on the tail system and causes the WIG 100 to pitch upward. Lowering the elevators 126 below the hinge point creates a net upward force on the horizontal stabilizer 124 and causes the WIG 100 to pitch downward. The elevators 126 may include actuators, which may be operated by a control system of the WIG 100 in order to raise and lower the elevators 126.

In some examples, the tail 106 may include one or more rudders 128*a*, 128*b*, 128*n*. The rudders 128*a*, 128*b*, 128*n* may each comprise a movable hinged surface on the trailing edge of the corresponding vertical stabilizers 122*a*, 122*b*, 122*n* for changing the aerodynamic shape of the vertical stabilizer 122 to control the yaw of the WIG 100 when operating in an airborne mode. It should be understood that rudders 128*a*, 128*b*, 128*n* can operate independently or in combination as desired. Moreover, in some examples, rudders 128*a*, 128*b*, 128*n* can be used as redundant systems, particularly useful in the event of one or more failures.

In some examples, the rudders 128*a*, 128*b*, 128*n* may additionally change a hydrodynamic shape of the hull 102 to control the yaw of the WIG 100 when operating in a waterborne mode. In order to facilitate such hydrodynamic control, the rudders 128*a*, 128*b*, 128*n* may be positioned low enough on the tail 106 that one or more of the rudders 128*a*, 128*b*, 128*n* is partially or entirely submerged when the hull 102 is floating in water. Namely, the rudders 128*a*, 128*b*, 128*n* may be positioned partially or entirely below a waterline of the hull 102. The rudders 128*a*, 128*b*, 128*n* may include one or more actuators, which may be operated by a control system of the WIG 100 in order to rotate the hinged surface of the rudders 128*a*, 128*b*, 128*n* to the left or right of the vertical stabilizer 122. Actuating the rudders 128*a*, 128*b*, 128*n* to the left (relative to the direction of travel) causes the WIG 100 to yaw left. Actuating the rudders 128*a*, 128*b*, 128*n* to the right (relative to the direction of travel) causes the WIG 100 to yaw right. As such, the rudders 128*a*, 128*b*, 128*n* may be used in combination with any of the other mechanisms disclosed herein for controlling the yaw of the WIG 100, including in combination with the ailerons 120 during airborne operation and in combination with varying the rotational speeds of different ones of the propeller assemblies 116 to help improve maneuverability of the WIG 100 during waterborne operation.

As depicted in FIG. 1F, it should be understood that the fundamental shape of tail 106, having one or more vertical stabilizers 122*a*, 122*b*, 122*n* and one or more horizontal stabilizers 124*a*, 124*b*, can result in a box-like assembly, wherein the vertical stabilizers are generally coupled to the horizontal stabilizers to form a reinforced box-like construction. This box-like construction provides enhanced structural integrity that enables tail 106 of some examples to be lighter and/or smaller than otherwise constructed.

While not shown in FIGS. 1A-1G, the WIG 100 may also include a distributed propulsion system on the tail 106, which may be similar to the distributed propulsion system of propeller assemblies 116 on the main wing 104. Such a distributed propulsion system may provide similar benefits of increasing the freestream velocity over the control surfaces (e.g., the elevators 126 and/or the rudder 128) to allow for increased pitch and yaw control of the WIG 100 at lower travel speeds. When determining the number and size of propeller assemblies to include on the tail 106, one may apply the same factors described above when determining the number and size of propeller assemblies to include on the main wing 104.

D. Hydrofoil Systems

As further shown in FIGS. 1A-1G, the WIG 100 may include one or more hydrofoil assemblies, such as the main hydrofoil assembly 108, which is positioned closer to the middle or bow of the WIG 100, and the rear hydrofoil assembly 110, which is positioned closer to the stern of the WIG 100. For instance, the main hydrofoil assembly 108 may be positioned between the bow and a midpoint (between the bow and stern) of the WIG 100, and the rear hydrofoil assembly 110 may be positioned below the tail 106 of the WIG 100. The main hydrofoil assembly 108 and the rear hydrofoil assembly 110 may help address a common challenge faced by waterborne WIGs, which is the process of breaking contact between the hull of the WIG and the water surface during takeoff. Prior to becoming airborne, WIGs experience a peak hydrodynamic drag, which is also known as the "hump drag." This can be problematic for WIGs, as a large amount of power may be required to overcome this hump drag, which is required to further increase forward velocity and transition to airborne flight.

Previous design attempts for reducing the hump drag include both aerodynamic and hydrodynamic design approaches. As noted above in connection with the discussion of previous WIG designs having low aspect ratio wings, one example of an aerodynamic design approach is through the use of a power augmented ram (PAR), which uses forward-mounted propulsors to blow air under the wing, thereby creating a high-pressure zone under the WIG and lifting the WIG out of the water. These PAR designs are not well-suited for WIGs with high aspect ratio wings but instead are more effective with low aspect ratio wings very close to the water where the high-pressure air can be better concentrated under the WIG. However, as noted above, low aspect ratio wings suffer significantly in aerodynamic efficiency and do not allow for a distributed blown-wing propulsion system.

Another example aerodynamic approach to reducing the hump drag is the use of catamaran hulls with textile skirts at the bow and stern to form an entrapped volume of air between the catamaran hulls. This volume of air can be inflated with high pressure air using the vehicle's aft propellers, allowing the vehicle to act as a quasi-hovercraft upon takeoff. However, this solution is less efficient than the PAR designs due to losses in the air tunnel, and presents additional challenges in the presence of waves on the water's surface.

Examples of hydrodynamic design approaches for reducing the hump drag include ski gear and fixed hydrofoils. Some WIGs have included ski gear, or deflecting planing tabs, to overcome the water suction and lift the WIG out of the water during takeoff. However, these designs have very high hydrodynamic drag, which may lead to reduced aerodynamic efficiency during flight. Other WIGs have included fixed hydrofoils that create an additional lift force while the WIG is waterborne in order to reduce the wetted surface area on the vehicle's hull at intermediate speeds prior to takeoff. However, because WIGs need to fly at very low altitudes when airborne, the fixed hydrofoils needed to be very short to avoid colliding with the water during flight. As a result, the fixed hydrofoils in these WIGs cannot lift the hull of the vehicle above the water waves during waterborne operation, which means the vehicles cannot (a) operate in high sea states or (b) operate at medium speeds (e.g., between the low speeds of a hull-borne operational mode and the high speeds of a wing-borne flight mode) in crowded harbors.

To improve upon and help address the issues of the previous WIG design described above, the main hydrofoil 108 and the rear hydrofoil 110 of the WIG 100 disclosed herein are configured to be retractable, large enough to lift the entire WIG out of the water and not impact the water surface, and to enable sustained operation in the hydrofoil-borne mode (where the entire weight of the craft is supported by the hydrofoil). The main hydrofoil assembly 108 may include a main foil 130, one or more main foil struts 132 that couple the main foil 130 to the hull 102, and one or more main foil control surfaces 134. Similarly, the rear hydrofoil assembly 110 may include a rear foil 136, one or more rear foil struts 138 that couple the rear foil 136 to the hull 102, and one or more rear foil control surfaces 140.

The main foil 130 and the rear foil 136 may each take the form of one or more hydrodynamic lifting surfaces (also referred to as "foils") designed to be operated submerged underwater while the hull 102 of the WIG 100 remains above and clear of the water's surface. In operation, as the WIG 100 moves through water with the main foil 130 and the rear foil 136 submerged, the foils generate a lifting force that causes the hull 102 to rise above the surface of the water. In order to cause the hull 102 to rise above the surface of the water, the lifting force generated by the foils must be at least equal to the weight of the WIG 100. The lifting force of the foils depends on the speed and angle of attack at which the foils move through the water, as well as their various physical dimensions, including the aspect ratio, the surface area, the span, and the chord of the foils.

The height at which the hull 102 is elevated above the surface of the water during hydrofoil-borne operation is limited by the length of the one or more main foil struts 132 that couple the main foil 130 to the hull 102 and the length of the one or more rear foil struts 138 that couple the rear foil 136 to the hull 102. In some examples, the main foil struts 132 and the rear foil struts 138 may be long enough to lift the hull 102 at least five feet above the surface of the water during hydrofoil-borne operation, which may allow for operation in substantially choppy waters. However, struts of other lengths may be used as well with the understanding that longer struts will allow for better wave-isolation of the hull 102 (but at the expense of stability of the WIG 100 and increasing complexity of the retraction system).

In practice, hydrofoils have a limited top speed before cavitation occurs, which results in vapor bubbles forming and imploding on the surface of the hydrofoil. Cavitation not only may cause damage to a hydrofoil, but also significantly reduces the amount of lift force generated by the hydrofoil and increases drag. Therefore, it is desirable to reduce the onset of cavitation by designing the main foil 130 and the rear foil 136 in a way that allows the foils to operate at higher speeds (e.g., ~20-45 mph) and across the entire required hydrofoil-borne speed envelope before cavitation occurs. For instance, the onset of cavitation may be controlled based on the geometric design of the main foil 130 and the rear foil 136. Additionally, the structural design of the main foil 130 and the rear foil 136 may allow the surfaces of the foils to flex and twist at higher speeds, which may reduce loading on the foils and delay the onset of cavitation.

Further, the distributed blown-wing propulsion system may help further delay the onset of cavitation on the main foil 130 and the rear foil 136. Cavitation is caused by both (i) the amount of lift force generated by a hydrofoil and (ii) the profile of the hydrofoil (which is affected by both the hydrofoil's angle of attack and its vertical thickness) as it moves through water. Reducing the amount of lift force generated by the hydrofoil delays the onset of cavitation. Because the blown-wing propulsion system creates additional lift on the main wing 104, the amount of lift force exerted on the main foil 130 and the rear foil 136 to lift the hull 102 out of the water is reduced. Further, because the main foil 130 and the rear foil 136 do not need to generate as much lift force to raise the hull 102 out of the water, their angles of attack may be reduced as well, which further reduces the onset of cavitation. By combining the blown-wing propulsion system with the hydrofoil designs described herein, the WIG 100 may operate in a hydrofoil-borne mode at speeds above 35 knots before cavitation occurs.

As shown in FIGS. 1A-1G, the main foil 130 may have a flattened V-shaped design in which a center portion of the main foil 130 is substantially flat and the ends of the main foil 130 extend upward toward the hull 102 of the WIG 100. This flattened V-shape design may allow for passive regulation of the distance between the hull 102 and the surface of the water (also referred to as "ride height") while also allowing for passive roll-moment control. The passive regulation of ride height is achieved by having the tips of the V-shaped hydrofoil breach the surface of the water, reducing the lifting surface that is underwater. If the ride height is too low, the increased hydrofoil surface area under the surface of the water will create a net force greater than the weight of the WIG 100, causing it to rise higher. If the ride height is too high, there will not be enough hydrofoil lifting area under the surface of the water, causing the WIG 100 to descend into the water. The passive roll stability is due to one side of the V-shaped hydrofoil breaching further out of the water than the other side. This creates a stabilizing roll moment when the WIG 100 is rolled to (for example) the left, because the left side of the V-shaped hydrofoil will have more surface under the water surface, allowing it to generate more lift than the right side.

As noted above, the main hydrofoil assembly 108 may include one or more main foil control surfaces 134, and the rear hydrofoil assembly 110 may include one or more rear foil control surfaces 140. The main foil control surfaces 134 may include one or more hinged surfaces on a trailing or leading edge of the main foil 130 as well as one or more actuators, which may be operated by a control system of the WIG 100 in order to rotate the hinged surfaces so that they extend above or below the main foil 130. The main foil control surfaces 134 on the main foil 130 may be operated in a similar manner as the flaps 118 and ailerons 120 on the wing 104 of the WIG 100. As one example, lowering the control surfaces 134 to extend below the main foil 130 may change a hydrodynamic shape of the main foil 130 in a manner that generates additional lift on the main foil 130, similar to the aerodynamic effect of lowering the flaps 118. As another example, asymmetrically raising one or more of the control surfaces 134 (e.g., raising a control surface 134 on only one side of the main foil 130) may change a hydrodynamic shape of the main foil 130 in a manner that generates a roll force on the main foil 130, similar to the aerodynamic effect of raising one of the ailerons 120.

Likewise, the rear foil control surfaces 140 may include one or more hinged surfaces on a trailing or leading edge of the rear foil 136 as well as one or more actuators, which may be operated by a control system of the WIG 100 in order to rotate the hinged surfaces so that they extend above or below the rear foil 136. The rear foil control surfaces 140 on the rear foil 136 may be operated in a similar manner as the elevators 126 on the tail 106 of the WIG 100. As one example, lowering the control surfaces 140 to extend below the rear foil 136 may change a hydrodynamic shape of the rear foil 136 in a manner that causes the WIG 100 to pitch downwards, similar to the aerodynamic effect of lowering the elevators 126. As another example, raising the control surfaces 140 to extend above the rear foil 136 may change a hydrodynamic shape of the rear foil 136 in a manner that causes the WIG 100 to pitch upwards, similar to the aerodynamic effect of raising the elevators 126.

In some examples, one or both of the main foil control surfaces 134 or the rear foil control surfaces 140 may include rudder-like control surfaces similar to the rudder 128 on that tail 106 of the WIG 100. For instance, the main foil control surfaces 134 may include one or more hinged surfaces on a trailing edge of the main foil strut 132 as well as one or more actuators, which may be operated by a control system of the WIG 100 in order to rotate the hinged surfaces so that they extend to the left or right of the main foil strut 132. Similarly, the rear foil control surfaces 140 may include one or more hinged surfaces on a trailing edge of the rear foil strut 138 as well as one or more actuators, which may be operated by a control system of the WIG 100 in order to rotate the hinged surfaces so that they extend to the left or right of the rear foil strut 138. Actuating the main foil control surfaces 134 or the rear foil control surfaces 140 in this manner may respectively change a hydrodynamic shape of the main foil strut 132 or the rear foil strut 138, which may allow for controlling the yaw of the WIG 100 when operating in a waterborne or hydrofoil-borne mode, similar to the effect of actuating the rudder 128 of the WIG 100 as described above.

In some examples, instead of (or in addition to) actuating hinged control surfaces on the main foil 130 and/or the rear foil 136, a control system of the WIG 100 may actuate the entire main foil 130 and/or the entire rear foil 136 themselves. As one example, the WIG 100 may include one or more actuators for rotating the main foil 130 and/or the rear foil 136 around the yaw axis. As another example, the WIG 100 may include one or more actuators for controlling an angle of attack of the main foil 130 and/or the rear foil 136 (i.e., rotating the main foil 130 and/or the rear foil 136 around the pitch axis). As another example, the WIG 100 may include one or more actuators for rotating the main foil 130 and/or the rear foil 136 around the roll axis. As another example, the WIG 100 may include one or more actuators for changing a camber or shape of the main foil 130 and/or the rear foil 136. As yet another example, the WIG 100 may include one or more actuators for flapping the main foil 130 and/or the rear foil 136 to help propel the WIG 100 forward or backwards. Other examples are possible as well.

Further, in some examples, the WIG 100 may dynamically control an extent to which the main foil 130 and/or the rear foil 136 are deployed based on an operational mode (e.g., hull-borne, hydrofoil-borne, or wing-borne modes) of the WIG 100. For instance, during hull-borne mode, the rear foil 110 may be partially deployed or retracted to increase turning authority. The amount of partial deployment or retraction may be a function of the desired overall vehicle draft when operating in a shallow water environment. During hydrofoil-borne mode, the main hydrofoil 108 may be partially retracted in order to reduce the distance between the hull of the vehicle and the water's surface. This may increase the amount of lift generated by the main wing 104 by operating the wing closer to the surface of the water, increasing the effects of aerodynamic ground effect.

As noted above, one or both of the main hydrofoil assembly 108 or the rear hydrofoil assembly 110 may interface with a deployment system that allows for retracting the main hydrofoil assembly 108 and/or the rear hydrofoil assembly 110 into or toward the hull 102 for hull-borne or wing-borne operation and extending the main hydrofoil assembly 108 and/or the rear hydrofoil assembly 110 below the hull 102 for hydrofoil-borne operation. The rear hydrofoil assembly 110 may interface with a deployment system that allows for retracting the rear hydrofoil assembly 110 into or toward the tail 106 for hull-borne or wing-borne operation and extending the rear hydrofoil assembly 110 below the tail 106 for hydrofoil-borne operation.

Figure 3:
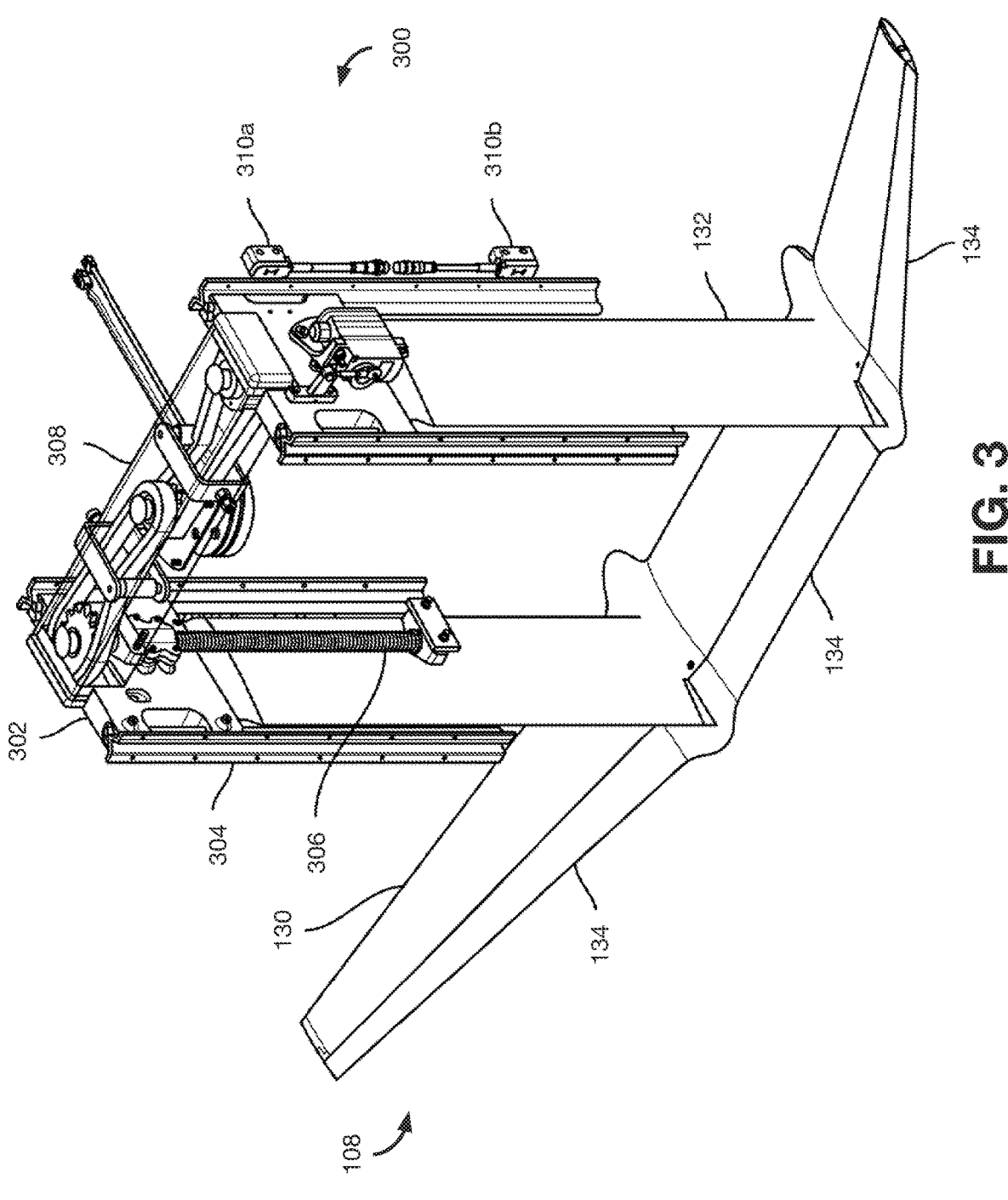
FIG. 3 depicts a main hydrofoil deployment system of the example WIG.

FIG. 3 depicts an example main hydrofoil deployment system 300 that allows for retracting and extending the main hydrofoil assembly 108. As shown, the main hydrofoil deployment system 300 may take the form of a linear actuator that includes one or more brackets 302 coupling the main hydrofoil assembly 108 (by way of the main foil struts 132) to one or more vertical tracks 304. The brackets 302 may be configured to move vertically along the tracks 304, such that when the brackets 302 move vertically along the tracks 304, the main hydrofoil assembly 108 likewise moves vertically. The brackets 302 may be coupled to a leadscrew 306 that, when rotated, causes vertical movement of the brackets 302. The leadscrew 306 may be rotated by any of various sources of torque, such as an electric motor coupled to the leadscrew 306 by a gearbox 308.

The main hydrofoil deployment system 300 may further include one or more sensors 310 configured to detect a vertical position of the main hydrofoil assembly 108. As shown, the sensors 310 include a first sensor 310a that senses when the main hydrofoil assembly 108 has reached a fully retracted position and a second sensor 310b that senses when the main hydrofoil assembly 108 has reached a fully extended position. However, the main hydrofoil deployment system 300 may include additional sensors for detecting additional discrete positions or continuous positions of the main hydrofoil assembly 108. The sensors 310 may be included as part of, or otherwise configured to communicate with, the control system of the WIG 100 to provide the control system with data indicating the position of the main hydrofoil assembly 108. The control system may then use the data from the sensors 310 to determine whether to operate the electric motor to retract or extend the main hydrofoil assembly 108.

In some examples, such as examples where the linear actuator is not a self-locking linear actuator, the main foil deployment system 300 may include a locking or braking mechanism for holding the main foil struts 132 in a fixed position (e.g., in a fully retracted or fully extended position). The locking mechanism may be, for example, a dual-action mechanical brake coupled to the electric motor, the leadscrew 306, or the gearbox 308.

While the above description provides various details of an example main foil deployment system 300, it should be understood that the main foil deployment system 300 depicted in FIG. 3 is for illustrative purposes and is not meant to be limiting. For instance, the main foil deployment system 300 may include any of various linear actuators now known or later developed that are capable of retracting and extending the main hydrofoil assembly 108.

Figure 4A:
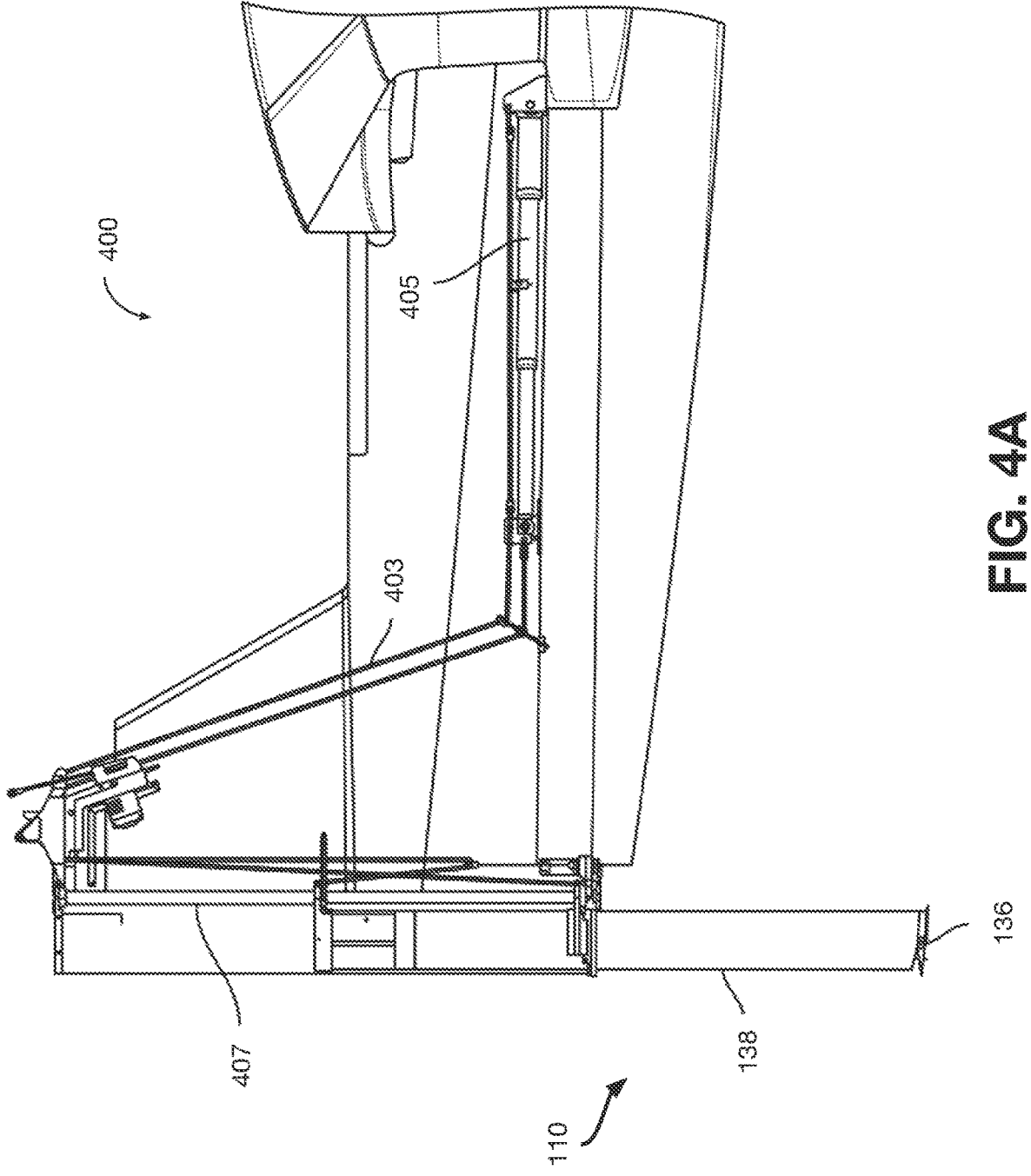
FIG. 4A depicts a rear hydrofoil deployment system of the example WIG.
Figure 4B:
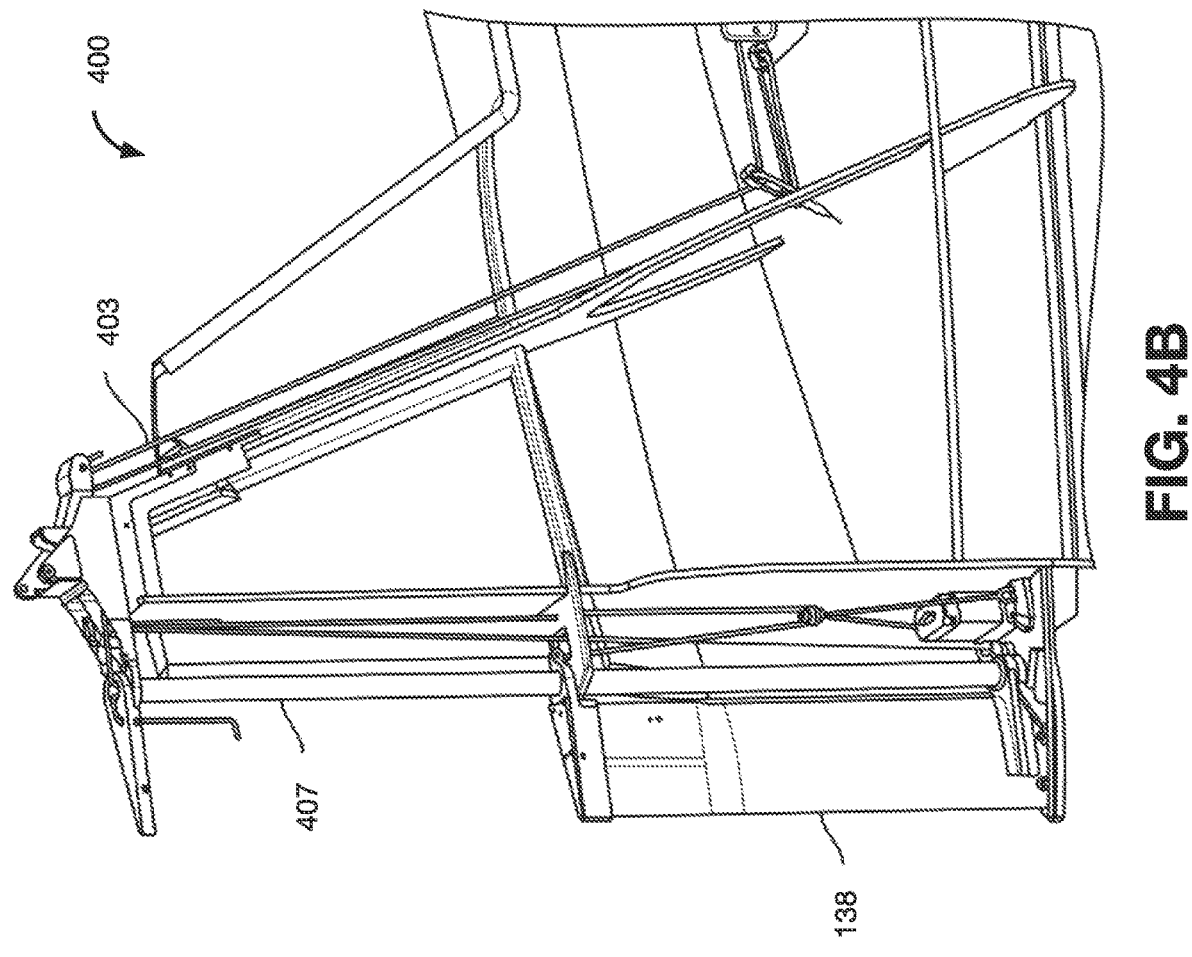
FIG. 4B depicts the rear hydrofoil deployment system of the example WIG.

FIGS. 4A and 4B depict an example rear foil deployment system 400 that allows for retracting and extending the rear foil 136. As shown, the rear foil deployment system 400 may include a pulley system 403 that couples an actuator 405 to the rear foil strut 138. When actuated, the actuator 405 causes the pulley system 403 to raise or lower the rear foil strut 138 by causing the rear foil strut 138 to slide vertically along a shaft 407. While not depicted in FIGS. 4A and 4B, the rudder 128 may also be mounted to the shaft 407 such that, when the actuator 405 raises the rear foil strut 138, the rear foil strut 138 retracts at least partially into the rudder 128. Additionally, the rear foil deployment system 400 may include one or more servo motors for rotating the rear foil strut 138 around the shaft. In this respect, the rear foil strut 138 may be rotated around the shaft to act as a hydro-rudder when submerged in water or to act as an aero-rudder when out of the water. Further, because the rudder 128 is mounted to the same shaft 407 as the rear foil strut 138 and the rear foil strut 138 can be retracted into the rudder 128, the same servo motor can also be used to control rotation of the rudder 128.

The actuator 405 of the rear foil deployment system 400 may take various forms and may, for instance, include any of various linear actuators now known or later developed that are capable of retracting and extending the rear hydrofoil assembly 110. Further, in some examples, the actuator 405 may have a non-unitary actuation ratio such that a given movement of the actuator 405 causes a larger corresponding induced movement of the rear hydrofoil assembly 110. This can help allow for faster retractions of the rear hydrofoil assembly 110, which may be beneficial during takeoff, as described in further detail below.

The main hydrofoil assembly 108 and/or the rear hydrofoil assembly 110 may be designed such that, when fully retracted, the hydrofoil assembly is flush, conformal, or tangent to the hull 102 and/or tail 106. For instance, in some examples, the hull 102 and/or tail 106 may include one or more recesses configured to receive the main hydrofoil assembly 108 and/or the rear hydrofoil assembly 110, and the main hydrofoil assembly 108 and/or the rear hydrofoil assembly 110 may be shaped such that when the main hydrofoil assembly 108 and/or the rear hydrofoil assembly 110 are fully retracted into the one or more recesses of the hull 102 and/or tail 106, the outer contour of the hull 102 and/or tail 106 forms a substantially smooth transition at the intersection of the hull 102 and the main hydrofoil assembly 108 and/or the rear hydrofoil assembly 110.

In other examples, the main hydrofoil assembly 108 and/or the rear hydrofoil assembly 110 may not conform to the shape of the hull 102 and/or tail 106 when fully retracted but instead may protrude slightly below the hull 102 and/or tail 106. In these examples, the main hydrofoil assembly 108 and/or the rear hydrofoil assembly 110 may have a non-negligible effect on the aerodynamics of the WIG 100, and the WIG 100 may be configured to leverage these effects to provide additional control of the WIG 100. For instance, when the main hydrofoil assembly 108 and/or the rear hydrofoil assembly 110 are retracted but still exposed, the exposed hydrofoil may be manipulated in flight to impart forces and moments on the WIG 100 similar to an aero-control surface. Traditional hydrofoils have control surfaces (such as flaps attached at the rear) that are sized to displace water and would not be effective in much-lighter-than-water air. One or both of the main hydrofoil assembly 108 and/or the rear hydrofoil assembly 110 of the WIG 100 disclosed herein, however, may be mounted on a pivot which is locked underwater but may be unlocked to allow the hydrofoil to move around the pivot in the air. At that point, the control surfaces act like trim tabs and are able to effect movement of the entire unlocked, pivoting hydrofoil which would otherwise impractically large and heavy servo motors. An additional benefit of this design is that the hydrofoil may be unlocked and moved through a slow servo and/or a combination of control surface movement combined with forward movement through water, and then re-locked such that the hydrofoil is at a selected angle of incidence.

Because the main hydrofoil assembly 108 is configured to be retractable, the hull 102 may include openings through which the struts 132 of the main hydrofoil assembly 108 may be retracted and extended. However, when the hull 102 contacts the water surface, water may seep into the hull 102 through these openings. To account for this, the hull 102 may be designed to isolate any water that enters the hull 102 and allow for the water to drain from the hull 102 when the hull 102 is lifted out of the water. For instance, the hull 102 may include pockets 142 on each side of the hull 102 aligned above the struts 132. The pockets 142 may be isolated from the remainder of the interior of the hull 102 so that when water accumulates in the pockets 142, the water does not reach any undesired areas, like the cockpit, passenger seating area, or any areas that house the battery system 200 or components of the control system of the WIG 100. Further, the pockets 142 may include venting holes or other openings located at or near the bottom of the pockets 142. While such venting openings may allow water to enter the pockets 142, they may likewise allow any accumulated water to vent out of the pockets 142 when the hull 102 is lifted out of the water.

While not shown in the figures, the main hydrofoil assembly 108 and/or the rear hydrofoil assembly 110 may further include one or more propellers for additional propulsion when submerged underwater. For instance, one or more propellers may be mounted to the main foil 130 and/or the rear foil 136. Such propellers may provide additional propulsion force to the WIG 100 during hydrofoil-borne or hull-borne operation. In some examples, the one or more propellers may additionally or alternatively be mounted to the hull 102 such that the propellers are submerged during hull-borne operation and may be used to provide additional propulsion force to the WIG 100 during hull-borne operation.

The main hydrofoil assembly 108 and/or the rear hydrofoil assembly 110 may further include various failsafe mechanisms in case of malfunction. For instance, if the main hydrofoil deployment system 300 or the rear hydrofoil deployment system 400 malfunctions and cannot retract the main hydrofoil assembly 108 and/or the rear hydrofoil assembly 110, then the WIG 100 may be configured to jettison the assembly that is unable to be retracted. The main hydrofoil assembly 108 and/or the rear hydrofoil assembly 110 may be coupled to the hull 102 by a releasable latch. The control system of the WIG 100 may identify a retraction malfunction, for instance based on data received from the positional sensors 310, and the control system may responsively open the latch to release the connection between the hull 102 and the malfunctioning hydrofoil assembly. In some examples, the weight of the malfunctioning hydrofoil assembly may provide sufficient force to jettison the malfunctioning hydrofoil assembly out of the hull 102 when the latch is opened, or the WIG 100 may include an actuator or some other mechanism to jettison the malfunctioning hydrofoil assembly out of the hull 102. In other examples, instead of jettisoning a malfunctioning hydrofoil assembly, the main hydrofoil assembly 108 and/or the rear hydrofoil assembly 110 may be designed to break in a controlled manner upon impact with a water surface. For instance, a joint between the main foil struts 132 and the hull 102 and/or a joint between the rear foil struts 138 and the hull 102 may be configured to disconnect when subjected to a torque significantly larger than standard operational torques at the joints. Other designs for providing controlled breaks are possible as well.

E. Control System

Figure 5:
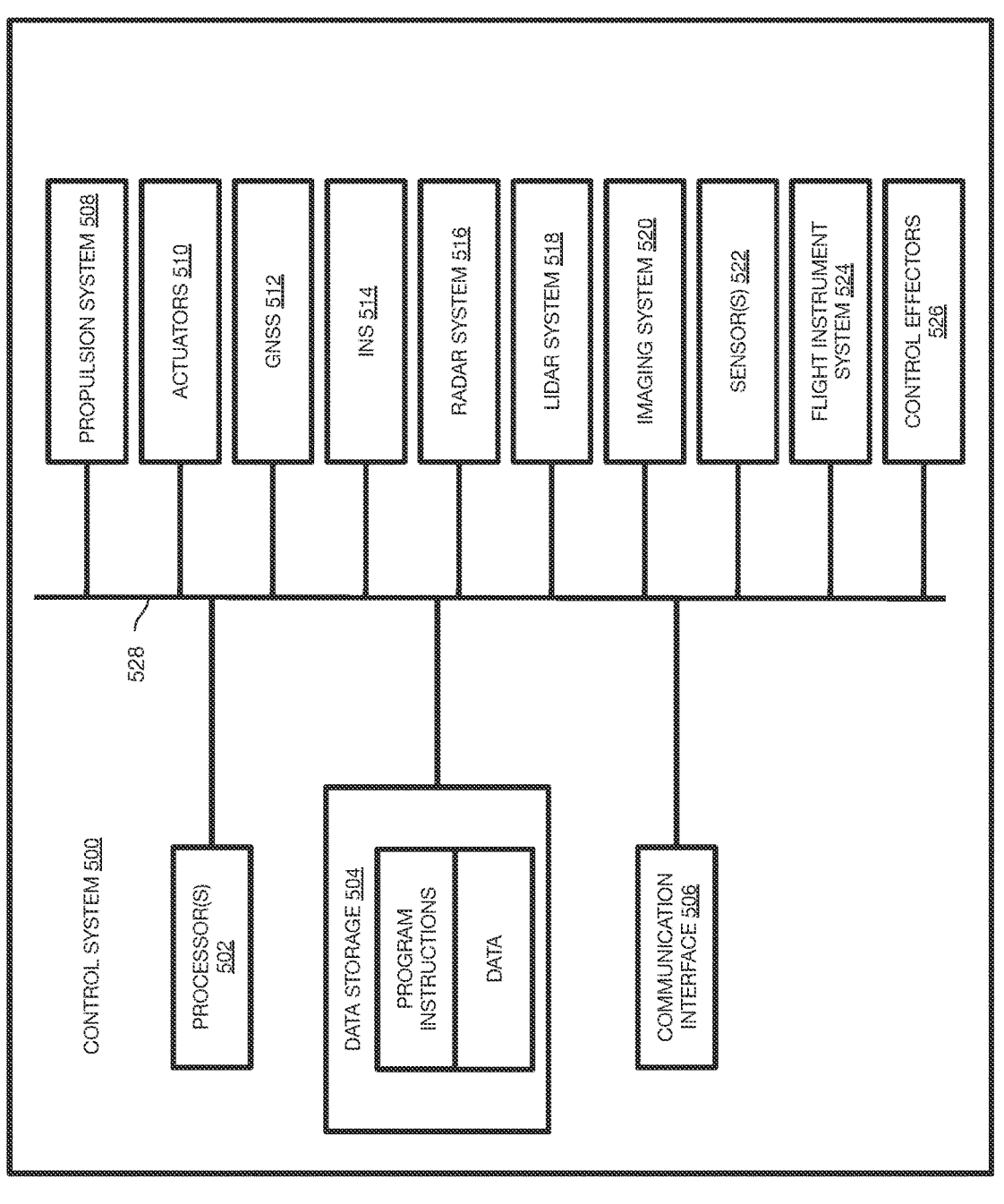
FIG. 5 depicts a control system of the example WIG.

FIG. 5 depicts a simplified block diagram illustrating various components that may be included in an example control system 500 of the WIG 100. The components of the control system 500 may include one or more processors 502, data storage 504, a communication interface 506, a propulsion system 508, actuators 510, a Global Navigation Satellite System (GNSS) 512, an inertial navigation system (INS) 514, a radar system 516, a lidar system 518, an imaging system 520, various sensors 522, a flight instrument system 524, and control effectors 526, some or all of which may be communicatively linked by one or more communication links 528 that may take the form of a system bus, a communication network such as a public, private, or hybrid cloud, or some other connection mechanism.

The one or more processors 502 may comprise one or more processing components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. Further, while the one or more processors 502 are depicted as a separate stand-alone component of the control system 500, it should also be understood that the one or more processors 502 could comprise processing components that are distributed across one or more of the other components of the control system 500.

The data storage 504 may comprise one or more non-transitory computer-readable storage mediums that are collectively configured to store (i) program instructions that are executable by the one or more processors 502 such that the control system 500 is configured to perform some or all of the functions disclosed herein, and (ii) data that may be received, derived, or otherwise stored, for example, in one or more databases, file systems, or the like, by the control system 500 in connection with the functions disclosed herein. In this respect, the one or more non-transitory computer-readable storage mediums of data storage 504 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. Further, while the data storage 504 is depicted as a separate stand-alone component of the control system 500, it should also be understood that the data storage 504 may comprise computer-readable storage mediums that are distributed across one or more of the other components of the control system 500.

The communication interface 506 may include one or more wireless interfaces and/or one or more wireline interfaces, which allow the control system 500 to communicate via one or more networks. Example wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Example wireline interfaces may include an Ethernet interface, a Universal Serial Bus (USB) interface, CAN Bus, RS-485, or similar interface to communicate via a wire, a twisted pair of wires, a coaxial cable, an optical link, a fiber-optic link, or other physical connection to a wireline network.

The propulsion system 508 may include one or more electronic speed controllers (ESCs) for controlling the electric motor propeller assemblies 116 distributed across the main wing 104 and, in some examples, across the horizontal stabilizer 124. In some examples, the propulsion system 508 may include a separate ESC for each respective propeller assembly 116, such that the control system 500 may individually control the rotational speeds of the electric motor propeller assemblies 116.

The actuators 510 may include any of the actuators described herein, including (i) actuators for raising and lowering the flaps 118, tail flaps 127, ailerons 120, elevators 126, main foil control surfaces 134, and rear foil control surfaces 140, (ii) actuators for turning the rudder 128, the main foil control surfaces 134 positioned on the main foil struts 132, and the rear foil control surfaces 140 positioned on the rear foil strut 138, (iii) actuators for retracting and extending the main hydrofoil assembly 108 and the rear hydrofoil assembly 110, and/or (iv) actuators for performing the various other disclosed actuations of the main hydrofoil assembly 108 and the rear hydrofoil assembly 110. Each of the actuators described herein may include any actuators now known or later developed capable of performing the disclosed actuation. Examples of different types of actuators may include linear actuators, rotary actuators, hydraulic actuators, pneumatic actuators, electric actuators, electro-hydraulic actuators, and mechanical actuators. Further, more specific examples of actuators may include electric motors, stepper motors, and hydraulic cylinders. Other examples are contemplated herein as well.

The GNSS system 512 may be configured to provide measurement of the location, speed, altitude, and heading of the WIG 100. The GNSS system 512 includes one or more radio antennas paired with signal processing equipment. Data from the GNSS system 512 may allow the control system 500 to estimate the position and velocity of the WIG 100 in a global reference frame, which can be used for route planning, operational envelope protection, and vehicle traffic deconfliction by both understanding where the WIG 100 is located and comparing the location with known traffic.

The INS 514 may include various sensors that are configured to provide data that is typical of well-known INS systems. For example, the INS 514 may include motion sensors, such as angular and/or linear accelerometers, and rotational sensors, such as gyroscopes, to calculate the position, orientation, and velocity of the WIG 100 using dead reckoning techniques. One or more INS systems may be used by the control system to calculate actuator outputs to stabilize or otherwise control the vehicle during all modes of operation.

The radar system 516 may be configured to provide data that is typical of well-known radar systems. For example, the radar system 516 may include a transmitter and a receiver. The transmitter may transmit radio waves via a transmitting antenna. The radio waves reflect off an object and return to the receiver. The receiver receives the reflected radio waves via a receiving antenna, which may be the same antenna as the transmitting antenna, and the radar system 516 processes the received radio waves to determine information about the object's location and speed relative to the WIG 100. This radar system 516 may be utilized to detect, for example, the water surface, maritime or airborne vehicle traffic, wildlife, or weather.

The lidar system 518 may be configured to provide data that is typical of well-known lidar systems. For example, the lidar system 518 may include a light source and an optical receiver. The light source emits a laser that reflects off an object and returns to the optical receiver. The lidar system 518 measures the time for the reflected light to return to the receiver to determine a distance between the WIG 100 and the object. This lidar system 518 may be utilized by the flight control system to measure the distance from the WIG 100 to the surface of the water in various spatial measurements.

The imaging system 520 may include one or more still and/or video cameras configured to capture image data from the environment of the WIG 100. In some examples, the cameras may include charge-coupled device (CCD) cameras, complementary metal-oxide-semiconductor (CMOS) cameras, short-wave infrared (SWIR) cameras, mid-wave infrared (MWIR) cameras, or long-wave infrared (LWIR) cameras. The imaging system 520 may provide any of various possible applications, such as obstacle avoidance, localization techniques, water surface tracking for more accurate navigation (e.g., by applying optical flow techniques to images), video feedback, and/or image recognition and processing, among other possibilities.

As noted above, the control system 500 may further include various other sensors 522 for use in controlling the WIG 100. In line with the discussion above, examples of such sensors 522 may include thermal sensors or other fire detection sensors for detecting a fire in the hull 102 or for detecting thermal runaway in the battery system 200. As further described above, the sensors 522 may include position sensors for sensing a position of the elevator 126, the tail flaps 127, the main hydrofoil assembly 108 and/or the rear hydrofoil assembly 110 (e.g., sensing whether the assemblies are in a retracted or extended position). Examples of position sensors may include photodiode sensors, capacitive displacement sensors, eddy-current sensors, Hall effect sensors, inductive sensors, or any other position sensors now known or later developed.

In some examples, the sensors 522 may include any of various altimeter sensors. As one example, the sensors 522 may include an ultrasonic altimeter configured to emit and receive ultrasonic waves. The emitted ultrasonic waves reflect off the water surface below the WIG 100 and return to the altimeter. The ultrasonic altimeter measures the time for the reflected ultrasonic wave to return to the altimeter to determine a distance between the WIG 100 and the water surface. As another example, the sensor 522 may include a barometer for use as a pressure altimeter. The barometer measures the atmospheric pressure in the environment of the WIG 100 and determines the altitude of the WIG 100 based on the measured pressure. As another example, the sensor 522 may include a radar altimeter to emit and receive radio waves. The radar altimeter measures the time for the radio wave to reflect off of the surface of the water below the WIG 100 to determine a distance between the WIG 100 and the water surface. These various sensors may be placed on different locations on the WIG 100 in order to reduce the impact of sensor constraints, such as sensor deadband or sensitivity to splashing water.

Further, the control system 500 may be configured to use various ones of the sensors 522 or other components of the control system 500 to help navigate the WIG 100 through maritime traffic or to avoid any other type of obstacle. For example, the control system 500 may determine a position, orientation, and velocity of the WIG 100 based on data from the INS 514 and/or the GNSS 512, and the control system 500 may determine the location of an obstacle, such as a maritime vessel, a dock, or various other obstacles, based on data from the radar system 516, the lidar system 518, and/or the imaging system 520. In some examples, the control system 500 may determine the location of an obstacle using the Automatic Identification System (AIS). In any case, based on the determined position, orientation, and velocity of the WIG 100 and the determined location of the obstacle, the control system 500 may maneuver the WIG 100 to avoid collision with the obstacle by actuating various control surfaces of the WIG 100 in any of the manners described herein.

The flight instrument system 524 may include various instruments for providing a pilot of the WIG 100 with data about the flight situation of the WIG 100. Example instruments may include instruments for providing data about the altitude, velocity, heading, orientation (e.g., yaw, pitch, and roll), battery levels, or any other information provided by the various other components of the control system 500.

The control effectors 526 may include various input devices that may allow an operator to interact with and input signals to the control system 500. Example control effectors 526 may include one or more joysticks, thrust control levers, buttons, switches, dials, levers, or touch screen displays, to name a few. In operation, a pilot may use the control effectors 526 to operate one or more control surfaces of the WIG 100. For instance, as one example, when the pilot moves the joystick in a particular direction, the control system 500 may actuate one or more control surfaces of the WIG 100 to cause the WIG 100 to move in the direction corresponding to the joystick movement. As another example, when the pilot actuates (or increases actuation of) the throttle, the control system 500 may cause a propulsion control surface of the WIG 100 (e.g., the propeller assemblies 116) to increase the propulsion force exerted on the WIG 100, and when the pilot reduces actuation of the throttle, the control system 500 may cause a propulsion control surface of the WIG 100 to decrease the propulsion force exerted on the WIG 100. Other examples of control effectors 526 may be implemented for actuating various control surfaces of the WIG 100 as well.

The control surfaces on the WIG 100 may be utilized by the control system 500 in different modes of operation. The amount of deflection of each control surface may be calculated by the control system 500 based on a number of input variables, including but not limited to vehicle position, velocity, attitude, acceleration, rotational rates, and/or altitude above water. Table 1 below identifies, for each control surface of the WIG 100, example operational modes in which the control surface may be used to control movement of the WIG 100. In the tables below, the propulsion control surfaces may include the propeller assembly 116 as well as any propellers mounted to the hull 102, main hydrofoil assembly 108, or rear hydrofoil assembly 110. The aerodynamic elevator control surfaces may include elevator 126, the aerodynamic ailerons may include ailerons 120, the aerodynamic rudder may include rudder 128 (when not submerged), the aerodynamic flaps may include flaps 118, the hydrodynamic elevator may include rear foil control surfaces 140, the hydrodynamic flaps may include main foil control surfaces 134, and the hydrodynamic rudder may include rudder 128 (when submerged).

TABLE 1

Example operational modes (Hull-borne, Hydrofoil-borne, Wing-borne) supported by control surfaces of the WIG 100.

| Control Surface | Hull-borne | Hydrofoil-borne | Wing-borne |
|---|---|---|---|
| Propulsion | Y | Y | Y |
| Aerodynamic Elevator | N | Y | Y |
| Aerodynamic Ailerons | N | Y | Y |
| Aerodynamic Rudder | Y | Y | Y |
| Aerodynamic Wing Flaps | N | Y | Y |
| Aerodynamic Tail Flaps | Y | Y | Y |
| Hydrodynamic Elevator | Y | Y | N |
| Hydrodynamic Flaps | Y | Y | N |
| Hydrodynamic Rudder | Y | Y | N |

When actuating the control surfaces in the various example operational modes identified in Table 1 above, the control system 500 may execute different levels of stabilization along the various vehicle axes during different modes of operation. Table 2 below identifies example stabilization controls that the control system 500 may apply during the various modes of operation for each axis of the WIG 100. Closed loop control may comprise feedback and/or feed forward control.

TABLE 2

Example stabilization control techniques applied to different axes of the WIG 100 for each operational mode.

| Vehicle Axis | Hull-borne | Hydrofoil-borne | Wing-borne |
|---|---|---|---|
| Pitch Axis | None | Closed loop control on vehicle ride height | Closed loop control on vehicle altitude |
| Roll Axis | None | Closed loop control around vehicle bank angle = 0 | Stabilization and closed loop control on heading |
| Yaw Axis | Rate stabilization | Closed loop control on vehicle heading | Closed loop control on vehicle heading |
| Speed Control | Closed loop control on vehicle GPS Speed | Closed loop control on vehicle GPS Speed | Closed loop control on vehicle airspeed |

Further, the control system 500 may be configured to actuate different control surfaces to control movement of the WIG 100 about its different axes. Table 3 below identifies example axial motions that are affected by the various control surfaces of the WIG 100.

| Control Surface | Axis Control Function |
|---|---|
| Propulsion | accelerate and decelerate the vehicle |

-continued

| Control Surface | Axis Control Function |
|---|---|
| | turn the vehicle about yaw axis |
| | create a rolling moment |
| Aerodynamic Elevator | create a pitch up or pitch down moment |
| Aerodynamic Ailerons | create a rolling moment |
| | increase lift on aerodynamic wing |
| | create a pitch down moment |
| Aerodynamic Rudder | create a yawing moment |
| Aerodynamic Wing Flaps | increase lift on aerodynamic wing |
| | create a pitch down moment |
| Aerodynamic Tail Flaps | create a pitch up moment |
| Hydrodynamic Elevator | create a pitch moment |
| | generate heave force on rear hydrofoil |
| Hydrodynamic Flaps | generate heave force on main hydrofoil |
| Hydrodynamic Rudder | create a yaw moment |

It should be understood that the control system 500 can be configured to optimize control outputs based on any one or a combination of functions, parameters, or considerations. By way of non-limiting example, the control system 500 can be configured to output a desired pitch which can be mapped as a pitch moment and control surface deflection based on the actuators being used. Moreover, the deflection of the elevator 126 and flaps (i.e., flaps 118 and tail flaps 127) can be mapped to or as a function of pitch, pitch rate, current actuator state, operational status of actuators (e.g., operational vs inoperational), altitude, motor output, weather conditions, loading conditions, temperature, and the like. This optimization can be driven to minimize draft, minimize power to deflect, maximize rate of response, or any other desired characteristics.

III. Example Modes of Operation

FIG. 6 depicts various example modes of operation of the WIG 100, separated into six numbered stages, each of which are described in further detail below.

A. Hull-Borne Operation

At stage one, the WIG 100 is docked and floating on the hull 102 (i.e., in a hull-borne mode) with the buoyancy of the outriggers 114 providing for roll stabilization of the WIG 100. While docked, the battery system 200 of the WIG 100 may be charged. Rapid charging may be aided with water-based cooling systems, which may be open- or closed-loop systems. The surrounding body of water may be used in the loop or as a heat sink. In some examples, the WIG 100 may include a heat sink integrated into the hull 102 for exchanging heat from the battery system 200 to the surrounding body of water. In other examples, the heat sink may be located offboard in order to reduce the mass of the WIG 100.

Additionally, while the WIG 100 is docked, the propeller assemblies 116 may be folded in a direction away from the dock to help avoid collision with nearby structures or people. This folding may be actuated in various ways, such as by metal spring force, hydraulic pressure, electromechanical actuation, or centrifugal force due to propeller rotation. Other examples are possible as well. Further, the main hydrofoil assembly 108 and the rear hydrofoil assembly 110 may be retracted (or partially retracted) to avoid collisions with nearby underwater structures.

Once any passengers or cargo have been loaded onto the WIG 100 and the WIG 100 is ready to depart, the WIG 100 can use its propulsion systems, including the propeller assemblies 116 and/or the underwater propulsion system (e.g., one or more propellers mounted to the hull 102, the main foil 130, and/or the rear foil 136), to maneuver away from the dock while remaining hull-borne. In some examples, the main hydrofoil assembly 108 and the rear hydrofoil assembly 110 may remain retracted (or partially retracted) during this maneuvering to reduce the risk of hitting underwater obstacles near docks or in shallow water-ways. However, when there is limited risk of hitting under-water obstacles, the WIG 100 may partially or fully extend the main hydrofoil assembly 108 and/or the rear hydrofoil assembly 110. With the main hydrofoil assembly 108 and/or the rear hydrofoil assembly 110 extended, the WIG 100 may actuate the main foil control surfaces 134 and/or the rear foil control surfaces 140 to improve maneuverability as described above.

At low speeds during hull-borne operation, the control system 500 may control a position and/or rotation of the WIG 100 by causing all of the propeller assemblies 116 to spin at the same idle speed, but with a first subset spinning in a forward direction and a second subset spinning in a reverse direction. For example, the control system 500 may cause propeller assemblies 116a, 116c, 116f, and 116h to idle in reverse and propeller assemblies 116b, 116d, 116e, and 116g to idle forward. In this arrangement, the control system 500 may cause the WIG 100 to make various maneuvers without having to change the direction of rotation of any of the propeller assemblies 116. For instance, in order to induce a yaw on the WIG 100, the control system 500 may increase the speed of the reverse propeller assemblies on one side of the wing 104 while increasing the speed of the forward propeller assemblies on the other side of the wing 104 and without causing any of the propeller assemblies to transition from forward to reverse or from reverse to forward. For example, idling the propellers at a nominal RPM may allow for faster response in generating a yaw moment on the WIG 100, because the propellers required for generating the yaw moment do not have to increase from zero RPM to the desired RPM value, they can spin from the idle RPM to the desired RPM value.

B. Hydrofoil-Borne Operation

In order to transition to stage two, the WIG 100 can fully extend the main hydrofoil assembly 108 and the rear hydro-foil assembly 110 (if not already extended) and accelerate using the propulsion system as previously described. The WIG 100 accelerates to a speed at which the main hydrofoil assembly 108 and the rear hydrofoil assembly 110 alone support the weight of the WIG 100, and the hull 102 is lifted above the surface of the water and clear of any surface waves (e.g., example embodiments may support a maximum wave height of ~3-5 ft).

While transitioning to this hydrofoil-borne mode, the control system 500 may actuate the main foil control sur-faces 134 and/or the rear foil control surfaces 140 and/or the propulsion system to stabilize the attitude of the WIG 100 in order to maintain the desired height above the surface of the water, vehicle heading, and vehicle forward velocity. For instance, the control system 500 may detect various changes in the yaw, pitch, or roll of the WIG 100 based on data provided by the INS 514, and the control system 500 may make calculated actuations of the main foil control surfaces 134 and/or the rear foil control surfaces 140 to counteract the detected changes.

Once the WIG 100 has fully transitioned to hydrofoil-borne operation and the hull 102 leaves the surface of the water, the drag forces exerted on the WIG 100 drop signifi-cantly due to the hull 102 no longer contributing to the water-based drag. As such, the control system 500 may reduce the speeds of the propeller assemblies 116 to lower the thrust of the WIG 100. The control system 500 can sustain this operational mode by actively controlling the pitch and speed of the WIG 100 so that the main hydrofoil assembly 108 and the rear hydrofoil assembly 110 continue to entirely support the weight of the WIG 100.

C. Wing-Borne Operation

In order to transition to wing-borne operation in stage three, the control system 500 may accelerate the WIG 100 by increasing the speeds of the propeller assemblies 116. The control system 500 may accelerate the WIG 100 to a desired takeoff speed. Because the WIG 100 is operating in a hydrofoil-borne mode at this point, the desired takeoff speed must be below the hydrofoil cavitation speed and is there-fore significantly limited. In some examples, the desired takeoff speed is approximately 40 knots. However, as described above, by arranging the propeller assemblies 116 in a blown-wing configuration, the WIG 100 may generate additional lift that allows for takeoff at such low speeds.

Once the control system 500 determines that the WIG 100 has reached the desired takeoff speed, the control system 500 may deploy the flaps 118 (and the ailerons 120 if configured as flaperons), causing the wing 104 to generate additional lift. Moreover, as described above, the control system 500 actuates the tail flaps 127 into an extended position in order to generate additional and/or maximum aerodynamic down-force in tail 106 and induced drag above a center of gravity of WIG 100 to singly or in combination create a pitch up moment in WIG 100 to aid in overcoming hydrodynamic drag to achieve a desired angle of attack of main wing 104. The control system 500 additionally actuates the rear foil control surfaces 140 and/or the elevators 126 in order to pitch the WIG 100 upward and increase the angle of attack of the wing 104 and the hydrofoil assemblies 108, 110. In this configuration, the wing 104 and hydrofoil assemblies 108, 110 create enough lift force to accelerate the WIG 100 upwards until the hydrofoil assemblies 108, 110 breach the surface of the water and the entire weight of the WIG 100 is supported by the lift of the wing 104.

In some examples, when performing this transition from hydrofoil-borne operation to wing-borne operation, the con-trol system 500 may quickly deploy the flaps 118 (and the ailerons 120 if configured as flaperons) over a very short period of time (e.g., in less than 1 second, less than 0.5 seconds, or less than 0.1 seconds). Quickly deploying the flaps 118 (and ailerons 120) in this manner creates even further additional lift forces on the wing 104 that may help "pop" the WIG 100 out of the water and into wing-borne operation.

Figure 7:
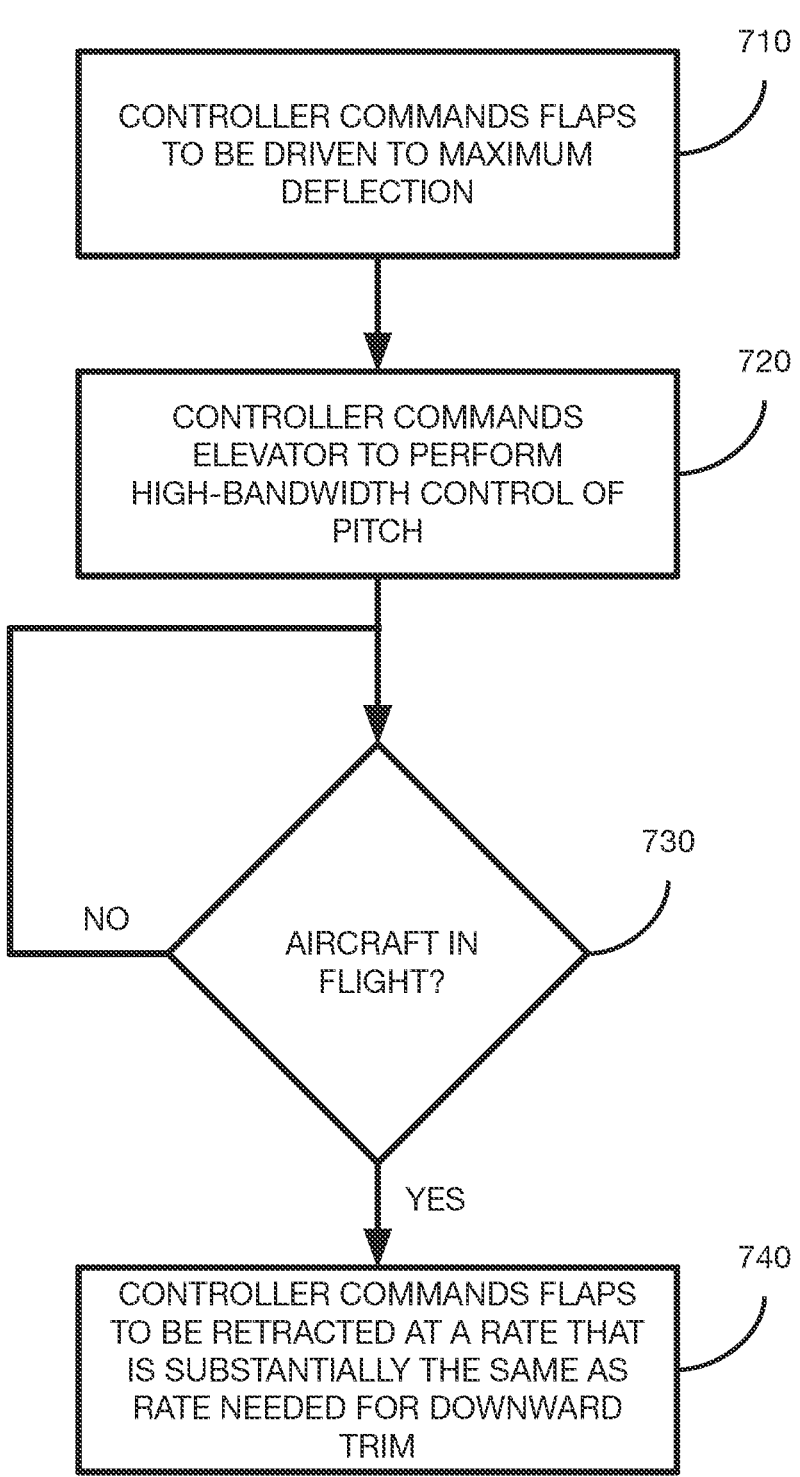
FIG. 7 depicts various operational control modes of the multi-foil tail of the example WIG.

Additionally, during the transition from hydrofoil-borne operation to wing-borne operation, the control system 500 may actuate various control surfaces (e.g., the elevator 126) of the WIG 100 to balance moments along the pitch axis. For instance, the propeller assemblies 116, the flaps 118, and the drag from the hydrofoil assemblies 108, 110 all generate nose-down moments around the center of gravity about the pitch axis during transition. To counteract these forces, as illustrated in FIG. 7, the control system 500 may deploy the elevator 126, the tail flaps 127, and the rear foil control surfaces 140 to a maximum setting or other setting to generate a nose-up moment and stabilize the WIG 100 at block 710. The control system 500 can perform high-bandwidth control of the elevator 126 for precise pitch control of the WIG 100. Likewise, at block 720, the control system 500 can perform low-bandwidth control of the elevator 126 and/or the tail flaps 127 for increased down-force and increased pitch up moment. As such, in some embodiments, the control actuation speed results in the elevator 126 being useful for pitch stabilization, and the tail flaps 127 being useful for trimming the vehicle.

Once the transition from hydrofoil-borne operation to wing-borne operation is complete at stage three (and block 730 of FIG. 7), the control system 500 may cause the main hydrofoil deployment system 300 and the rear hydrofoil deployment system 400 to respectively retract the main hydrofoil assembly 108 and the rear hydrofoil assembly 110. In practice, the control system 500 may initiate this retraction as soon as the hydrofoil assemblies 108, 110 are clear of the water in order to reduce the chance of the hydrofoil assemblies 108, 110 reentering the water. The control system 500 may determine that the hydrofoil assemblies 108, 110 are clear of the water in various ways. As one example, the control system 500 may make such a determination based on a measured altitude of the WIG 100 (e.g., based on data provided by the radar system 516, the lidar system 518, or the other sensors 522 described above for measuring an altitude of the WIG 100). As another example, the sensors 522 may further include one or more conductivity sensors, temperature sensors, pressure sensors, strain gauge sensors, or load cell sensors arranged on the hydrofoil assemblies 108, 110, and the control system 500 may determine that the hydrofoil assemblies 108, 110 are clear of the water based on data from these sensors.

Once the WIG 100 is clear of the water, the control system 500 can continue to accelerate the WIG 100 to a desired cruise velocity by controlling the speed of the propeller systems 116. The control system 500 may retract the flap systems when the WIG 100 has achieved sufficient airspeed to generate enough lift to sustain altitude without them. In some examples (and still in the acceleration phase) as illustrated at block 740 of FIG. 7, tail flaps 127 can be retracted at substantially the same rate one would need application of downward trim. It should be understood that the retraction of tail flaps 127 can be based on a fixed aircraft speed schedule, the specific loading configuration of the WIG 100, and/or in response to a determination of the downward deflection. By way of non-limiting example, it should be understood that in some examples when the elevator 126 is deflected downward, tail flaps 127 could be retracted to reduce or eliminate the need for downward deflection of the elevator 126, thereby resulting in reduced total drag and increased efficiency.

Additionally, the control system 500 can actuate the various control surfaces of the WIG 100 and/or apply differential thrust to the propeller systems 116 to perform any desired maneuvers, such as turning, climbing, or descending, and to provide efficient lift distribution. While in wing-borne mode, the WIG 100 can fly both low over the water's surface in ground-effect, or above ground-effect depending on operational conditions and considerations.

Figure 8:
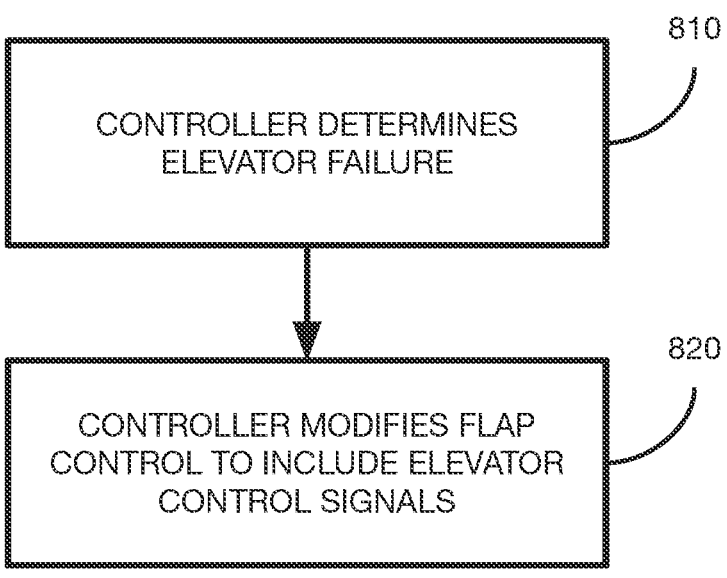
FIG. 8 depicts various operational control modes in response to an elevator failure.

During normal flight (i.e., wing-borne mode), tail flaps 127 can remain fully retracted to reduce drag and increase efficiency. However, in event the elevator 126 fails, the tail flaps 127 can be extended to maintain pitch stability of the WIG 100. That is, in some embodiments as illustrated in FIG. 8, control system 500 can determine a failure of the elevator 126 at block 810. This may be determined by control system 500 using data obtained from one or more motion and/or position sensors associated with the elevator 126. A command can be sent to the elevator actuator to move the elevator 126 a determined distance and/or in a determined direction. Expected positional data is determined by the control system 500 based on the command sent to the elevator actuator. Positional data is received by the control system 500 from the one or more sensors on the elevator 126. The received positional data is compared with the expected positional data to determine if a failure has occurred. If the received positional data is different than the expected positional data by more than a threshold, then the control system 500 determines a failure has occurred with the elevator 126. One example failure is "no output." At block 820, control system 500 modifies the flap control signal to include the pitch control signal otherwise sent to the elevator 126. The output typically delivered to the tail flaps 127 is modified sufficiently to achieve the same pitch as would have been achieved by the elevator 126. The tail flaps 127 are used as primary pitch control element to get the plane to safety during failure of the elevator 126.

D. Return to Hull-Borne Operation

In order to transition to stage four, the control system 500 determines that the hydrofoil assemblies 108, 110 are fully retracted so that the WIG 100 may safely land on its hull 102. The control system 500 may additionally determine and suggest a desired landing direction and/or location based on observed, estimated, or expected water surface conditions (e.g., based on data from the radar system 516, the lidar system 518, the imaging system 520, or other sensors 522).

The control system 500 initiates deceleration of the WIG 100, for instance by reducing the speeds of the propeller systems 116, until the WIG 100 reaches a desired landing airspeed. During the deceleration, the control system 500 may deploy the flaps 118 to increase lift at low airspeeds and/or to reduce the stall speed, and may further deploy the tail flaps 127 to provide increased pitch authority. In some embodiments, as deceleration continues (or during any phase of flight), the control system 500 can extend the tail flaps 127 as necessary to keep or maintain the elevator 126 minimally loaded. In some embodiments, if the rate of extension or deployment of the tail flaps 127 is sufficiently high, the elevator 126 is not required to maintain a sustained aerodynamic load or torque and, therefore, can be designed to be smaller and/or lighter and potentially require less vehicle power. Once the WIG 100 reaches the desired landing airspeed (e.g., approximately 50 knots), the control system 500 reduces the descent rate (e.g., to be less than approximately 200 ft/min). As the WIG 100 approaches the surface of the water (e.g., once the control system 500 determines that the WIG 100 is within 5 feet of the water surface), the control system 500 further slows the descent rate to cushion the landing (e.g., to be less than approximately 50 ft/min). As the hull 102 of the WIG 100 impacts the surface of the water, the control system 500 reduces thrust, and the WIG 100 rapidly decelerates due to the presence of hydrodynamic drag, the reduction in forward thrust, and the reduction or elimination of blowing air over the wing which significantly reduces lift causing the vehicle to settle into the water. The hull 102 settles into the water as the speed is further reduced until the WIG 100 is stationary.

Once the WIG 100 is settled in the water, the WIG 100 may transition to stage five by extending the hydrofoil assemblies 108, 110 in order to transition from hull-borne operation to hydrofoil-borne operation in the same manner as described above. The control system 500 may then sustain the hydrofoil-borne mode at stage five and maneuver the WIG 100 into port while keeping the hull 102 insulated from surface waves. The WIG 100 may then transition to back to hull-borne operation in stage six when the control system 500 reduces the thrust generated by the propeller assemblies 116 to lower the speed of the WIG 100 until the hull 102 settles into the water. The control system 500 may then retract the hydrofoil assemblies 108, 110 and engage in hull-borne operation as described above to maneuver the WIG 100 into a dock for disembarking passengers or goods and recharging the battery system 200.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An airborne vehicle comprising:
a body section;
a main wing extending from the body section configured to generate aerodynamic lift, the main wing comprising one or more main wing control surfaces; and
a tail assembly extending from the body section aft of the main wing, the tail assembly comprising:
(i) a first tail member horizontal stabilizer having a substantially uniform first chord length;
(ii) a second horizontal stabilizer having a substantially uniform second chord length, wherein the second chord length is substantially equal to the first chord length;
(iii) a first vertical stabilizer;
(iv) a second vertical stabilizer; and
(v) a third vertical stabilizer, the first horizontal stabilizer being substantially parallel to the second horizontal stabilizer, the first horizontal stabilizer having one or more control surfaces, the second horizontal stabilizer having one or more control surfaces that comprise one or more flap surfaces selectively deployable between a retracted position and an extended position, the one or more flap surfaces being configured to increase at least one of a surface area or camber of the second horizontal stabilizer in the extended position, and wherein each of the first, second, and third vertical stabilizers is connected to and extends between the first horizontal stabilizer and the second horizontal stabilizer.

2. The airborne vehicle according to claim 1 further comprising:
a deployment mechanism operably coupled to the one or more flap surfaces of the second horizontal stabilizer, the deployment mechanism being configured to move the one or more flap surfaces between the retracted position and the extended position.

3. The airborne vehicle according to claim 2, wherein the deployment mechanism comprises at least one actuator operably coupled to the one or more flap surfaces, the at least one actuator being disposed in the one or more of the first, second, and third vertical stabilizers or in the body section.

4. The airborne vehicle according to claim 1, wherein the first, second, and third vertical stabilizers comprise one or more control surfaces.

5. The airborne vehicle according to claim 4, wherein the one or more control surfaces of the first, second, and third vertical stabilizers comprise one or more rudders.

6. The airborne vehicle according to claim 1, further comprising:
a blown-wing propulsion system that includes a plurality of electric motors propellor assemblies distributed across a leading edge of the main wing.

7. The airborne vehicle according to claim 6, wherein the blow-wing propulsion system is configured to output an aerodynamic effect, and wherein the first horizontal stabilizer is positioned generally within the aerodynamic effect.

8. The airborne vehicle according to claim 6, wherein the blow-wing propulsion system is configured to output an aerodynamic effect, and wherein the second horizontal stabilizer is positioned generally above the aerodynamic effect.

9. The airborne vehicle according to claim 1, wherein the one or more flap surfaces is configured as a flap system.

10. The airborne vehicle according to claim 1, wherein the one or more flap surfaces is configured to exert a pitch moment when the one or more flap surfaces is in the extended position.

11. The airborne vehicle according to claim 1, wherein the one or more flap surfaces is configured to generate a downward aerodynamic force in the extended position.

12. The airborne vehicle according to claim 1, wherein a ratio of a surface area of the first horizontal stabilizer to the surface area of the second horizontal stabilizer is in the range of 0.9 to 1.6.

13. The airborne vehicle according to claim 1, wherein a separation distance between the first horizontal stabilizer and the second horizontal stabilizer is in the range of 0.25 to 0.75 of a lower horizontal stabilizer span.

14. The airborne vehicle according to claim 1, wherein the first horizontal stabilizer is positioned horizontally below the second horizontal stabilizer.

15. The airborne vehicle according to claim 1, wherein the first horizontal stabilizer is positioned horizontally above the second horizontal stabilizer.

16. The airborne vehicle according to claim 1, wherein the one or more control surfaces of the first horizontal stabilizer comprises one or more elevators.

17. The airborne vehicle according to claim 1, wherein the body section comprise a hull and the main wing comprises a pair of outriggers, the hull and the pair of outriggers configured to contact a water surface.

18. The airborne vehicle according to claim 1, further comprising a retractable hydrofoil system positioned below the tail assembly.

19. The airborne vehicle of claim 1, wherein the third vertical stabilizer is arranged between the first vertical stabilizer and the second vertical stabilizer, and wherein the third vertical stabilizer is substantially aligned with a central longitudinal axis of the body section.

20. The airborne vehicle of claim 1, wherein each of the first, second, and third vertical stabilizers comprises a control surface.

* * * * *